US012669944B2

(12) United States Patent
Dong et al.

(10) Patent No.: US 12,669,944 B2
(45) Date of Patent: Jun. 30, 2026

(54) SYSTEM AND METHOD FOR OPERATING A MEMORY DEVICE

(71) Applicant: Yangtze Memory Technologies Co., Ltd., Wuhan (CN)

(72) Inventors: Wenwen Dong, Wuhan (CN); Yahai Liu, Wuhan (CN); Wei Huang, Wuhan (CN); Weijun Wan, Wuhan (CN); Jianjie Li, Wuhan (CN); Feihao Cen, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/639,911

(22) Filed: Apr. 18, 2024

(65) Prior Publication Data

US 2025/0298516 A1     Sep. 25, 2025

(30) Foreign Application Priority Data

Mar. 19, 2024     (CN) .......................... 202410318732.9

(51) Int. Cl.
*G06F 3/06*          (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0679; G06F 3/0659
See application file for complete search history.

(56) References Cited

U.S. PATENT DOCUMENTS

| | | | | |
|---|---|---|---|---|
| 11,514,989 | B2 * | 11/2022 | Kaynak | G11C 29/028 |
| 2019/0287629 | A1 * | 9/2019 | Bang | G06F 3/0688 |
| 2022/0406382 | A1 * | 12/2022 | Komatsu | G11C 16/3409 |
| 2023/0005550 | A1 * | 1/2023 | Park | G06F 3/061 |

* cited by examiner

*Primary Examiner* — Mark A Giardino, Jr.
(74) *Attorney, Agent, or Firm* — Fish & Richardson P.C.

(57)          ABSTRACT

The present disclosure relates to methods and devices for performing a read operation in a memory. In one example, a method for operating a memory device includes performing sensing operations on memory cells of the memory device based on at least one voltage or at least one develop time. The memory cells are coupled to a word line. The method further includes identifying a read offset based on results of the sensing operations. The read offset can include a read voltage selected from the at least one voltage, or a read develop time selected from the at least one develop time. The method further includes storing the read offset in the memory device to be directly applied in a read operation on the memory cells.

20 Claims, 14 Drawing Sheets

FROM FIG. 7A

1200

1202 — Set configuration data as
AVD_ENABLE = 1, AVD_APPLY = 1

1204 — Perform sensing operations for valley detection
before a read operation

1206 — Set configuration data as
AVD_ENABLE = 0, AVD_APPLY = 1

1208 — Perform read operations based on read offset
generated from the sensing operations

SYSTEM AND METHOD FOR OPERATING A MEMORY DEVICE

CROSS-REFERENCE TO RELATED APPLICATIONS

This application claims priority to Chinese Patent Application No. 202410318732.9, filed on Mar. 19, 2024, which is hereby incorporated by reference in its entirety.

TECHNICAL FIELD

This description generally relates to the field of semiconductor technology, and more particularly, to systems and methods for operating a memory device.

BACKGROUND

As memory devices shrink to smaller die sizes, manufacturing cost decreases, and storage density increases. Besides horizontally scaling memory cells in a single layer, a three-dimensional (3D) memory architecture can be used to vertically stack multiple layers of memory cells, which increases the storage density per unit area.

The vertically stacked memory cells can form memory strings, and in each memory string, channels of the memory cells are connected. Each memory cell can be addressed through a word line and a bit line. Data (i.e., logic states) of the memory cells sharing the same word line can be read or programmed at the page level. However, reliability (e.g., threshold voltage ($V_{th}$) distribution shift) can be a concern for a memory device when aggressive scaling is performed.

SUMMARY

The present disclosure relates to methods for operating memory device, memory devices and memory systems. In one example, a method for operating a memory device includes performing sensing operations on memory cells of the memory device based on at least one voltage or at least one develop time. The memory cells are coupled to a word line. The method further includes identifying a read offset based on results of the sensing operations. The read offset can include a read voltage selected from the at least one voltage, or a read develop time selected from the at least one develop time. The method further includes storing the read offset in the memory device. The read offset can be directly applied to a read operation on the memory cells.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

In high density memory devices such as a NAND memory, threshold voltage ($V_{th}$) distribution shift can be impacted by many factors, such as charge loss in programmed cells, noises, long service time, etc. After $V_{th}$ distribution shift, a pre-defined read level can no longer track the $V_{th}$ distribution, which can result in read failures. Therefore, tracking the $V_{th}$ distribution and adjusting the read level are needed to improve the reliability of the NAND memory.

In some implementations, automated valley detection (AVD) can be used to track the $V_{th}$ distribution by performing sensing operations on memory cells. The sensing operations can generate a read offset that includes a read voltage or a read develop time. The read offset can represent the valley of the $V_{th}$ distribution after the $V_{th}$ distribution shift. The present disclosure provides techniques to perform sensing operations to obtain the read offset, and to perform read operations based on the obtained read offset. In some implementations, the read offset obtained from the sensing operations can be stored in a SRAM of the memory device. As such, the memory device can directly apply the read offset in the SRAM to subsequent read operations, which can improve efficiency and feasibility of the memory device.

Figure 1:
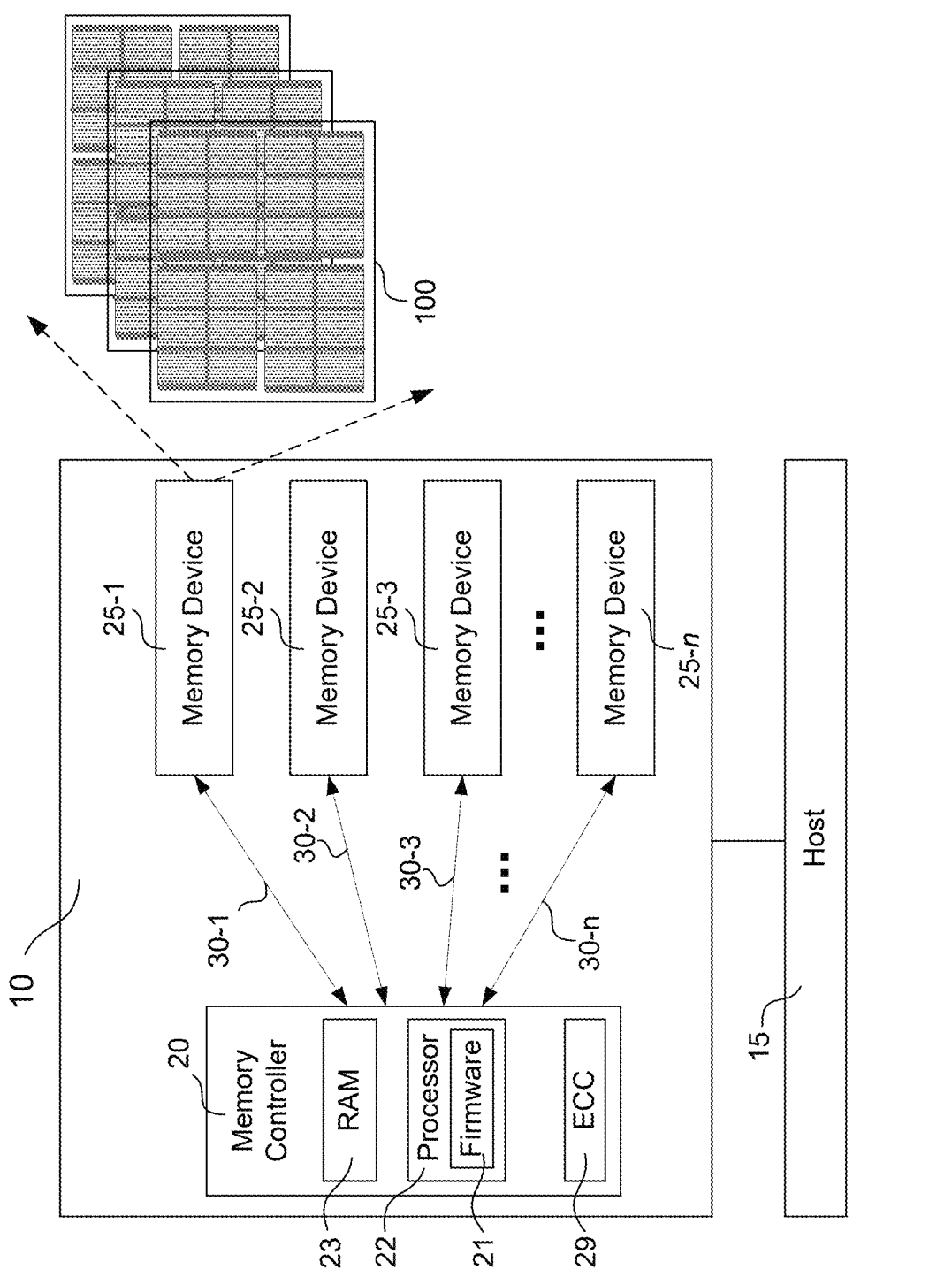
FIGS. 1, 2, and 3 illustrate a storage system with one or more memory devices, according to some aspects of the present disclosure.

FIG. 1 illustrates a block diagram of an electronic device having a storage system 10, according to some aspects of the present disclosure. In some implementations, the electronic device can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. The storage system 10 (e.g., a NAND storage system) can include a memory controller 20 and one or more memory devices 25-1, 25-2, 25-3, . . . , 25-n. Each memory device 25 can be a NAND memory device. The storage system 10 can communicate with a host 15 through the memory controller 20. The memory controller 20 can manage the one or more memory devices 25-1, 25-2, 25-3, . . . , 25-n, via one or more memory channels 30-1, 30-2, 30-3, . . . , 30-n.

In some implementations, the host 15 (e.g., a host computer) can include a processor of an electronic device, such as a central processing unit (CPU), a system-on-chip (SoC), or an application processor (AP). The host 15 can send data to be stored at the storage system 10 and retrieve data from the storage system 10.

In some implementations, the memory controller 20 can be configured to perform varies tasks including handling I/O requests received from the host 15, ensuring data integrity and efficient storage, and managing the memory device 25. To perform these tasks, the memory controller 20 can include one or more processors 22 (e.g., micro-controller units, CPU) to run a firmware 21. For example, the memory controller 20 can run the firmware 21 to map logical addresses (e.g., addresses utilized by the host associated with host data) to physical addresses in the memory device 25 (e.g., actual locations where the data are stored). The memory controller 20 can also run the firmware 21 to manage defective memory blocks in the memory device 25. For example, the firmware 21 can remap the logical address to a different physical address (aka, move the data from the defective memory blocks to other memory blocks). The memory controller 20 can also include one or more memories 23 (e.g., DRAM, SRAM, EPROM, etc.) for storing various metadata used by the firmware 21. In some implementations, the memory controller 20 can perform error recovery through an error correction code (ECC) engine 29. The ECC engine 29 can detect and correct raw bit errors that occur within each memory device 25.

In some implementations, the memory controller 20 communicates with each memory device 25 through the memory channels 30 via a data bus. The memory controller 20 can select one of the memory devices 25 according to a device enable signal.

In some implementations, each memory device 25 in FIG. 1 can include one or more memory dies 100, where the memory die can be a NAND memory die.

Figure 3:
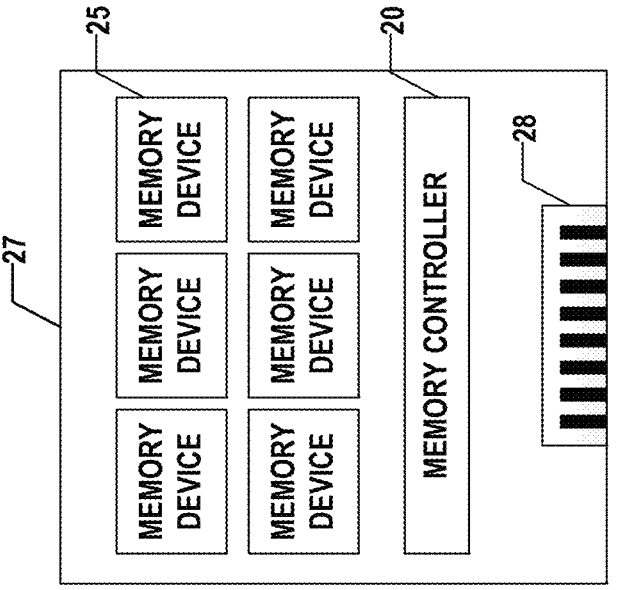
Figure 2:
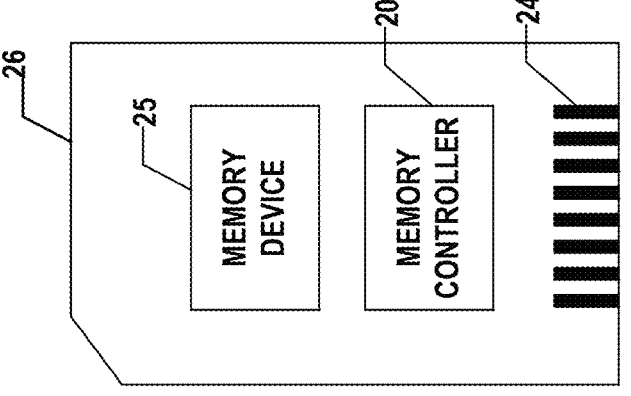

In some implementations, the memory controller 20 and one or more memory devices 25 can be integrated into various types of storage packages. For example, they can be included in the same package, such as a universal Flash storage (UFS) package or an eMMC package. As such, the storage system 10 can be implemented and incorporated into different types of electronic products. In an example shown in FIG. 2, the memory controller 20 and a single memory device 25 can be integrated into a memory card 26. The memory card 26 can include a PC card (i.e., PCMCIA card, where PCMCIA is short for personal computer memory card international association), a CF card, a smart media (SM) card, a memory stick, a multimedia card (MMC, RS-MMC, MMCmicro), an SD card (including SD, miniSD, microSD, SDHC, etc.), a UFS, etc. The memory card 26 can further include a memory card connector 24 that couples the memory card 26 with a host (e.g., the host 15 in FIG. 1). In another example as shown in FIG. 3, the memory controller 20 and multiple memory devices 25 can be integrated into a solid-state drive (SSD) 27. The SSD 27 can further include an SSD connector 28 that couples the SSD 27 with a host (e.g., the host 15 in FIG. 1).

Figure 4:
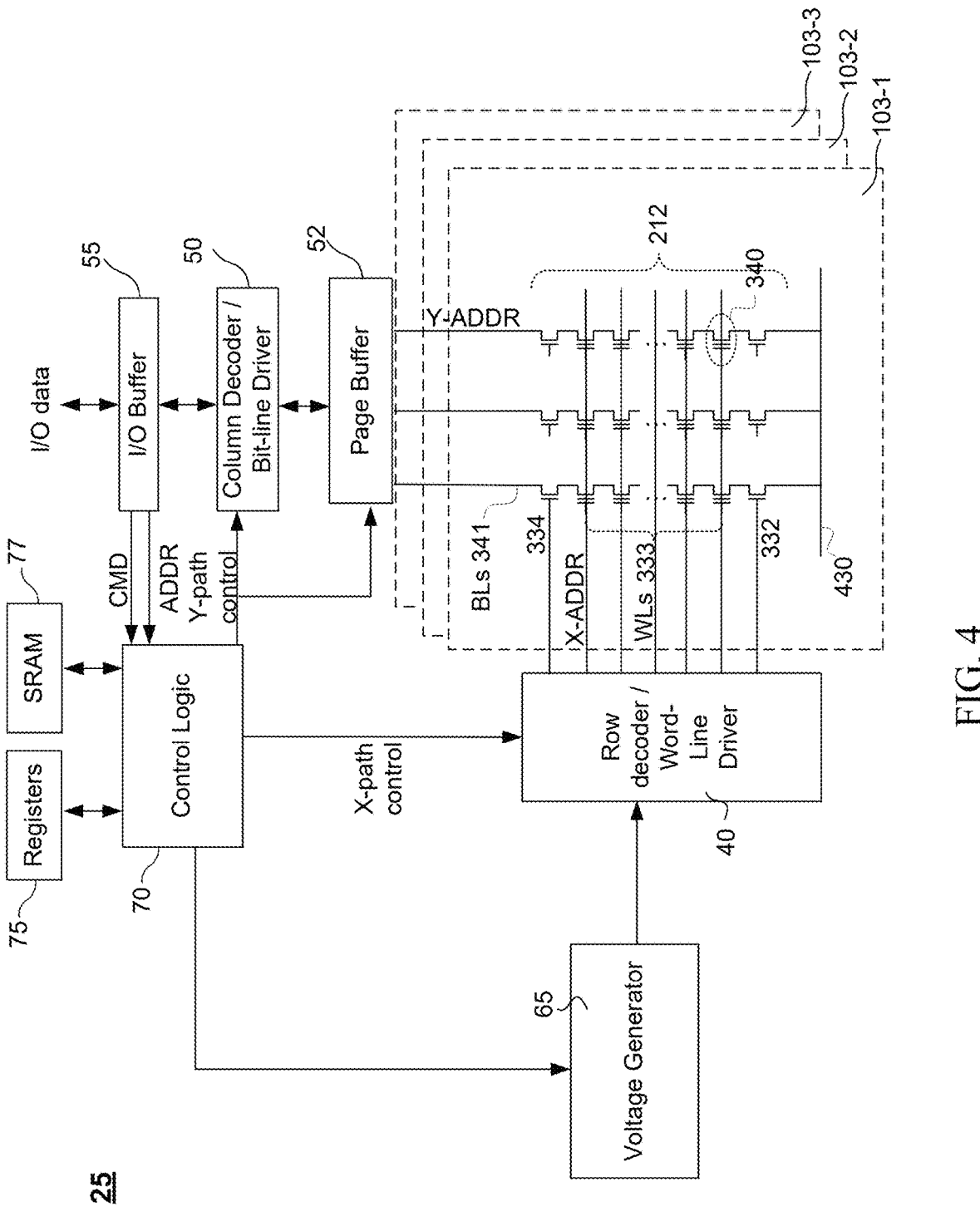
FIG. 4 illustrates a schematic of a memory device, according to some aspects of the present disclosure.

FIG. 4 illustrates a schematic diagram of the memory device 25, according to some aspects of the present disclosure. In some implementations, the memory device 25 can include one or more memory blocks 103 (e.g., 103-1, 103-2, 103-3). Each memory block 103 can include a plurality of memory strings 212. Each memory string 212 can include a plurality of memory cells 340. Memory cells 340 in different memory strings can share the same word line 333. A memory string 212 can include at least one field effect transistor (e.g., MOSFET) at each end, which is controlled by a lower select gate ("LSG") 332 and a top select gate ("TSG") 334, respectively. The lower select gates ("LSGs") can also be referred to as bottom select gates ("BSGs"). The drain terminal of the TSG 334 can be connected to a bit line 341, and the source terminal of the LSG 332 can be connected to an array common source ("ACS") 430. The ACS 430 can be shared by the memory strings 212 in an entire memory block, and is also referred to as the common source line.

In some implementations, the memory device 25 can include a periphery circuit that can include many digital, analog, and/or mixed-signal circuits to support functions of the memory block 103. For example, the peripheral circuit can include a page buffer 52, a row decoder 40 (aka, a word-line driver), a column decoder 50 (aka, a bit-line driver), a voltage generator 65, an input/output buffer 55, control logic 70, registers 75 and a SRAM 77. The control logic 70 can include one or more control circuits. These control circuits can include active and/or passive semiconductor devices, such as transistors, diodes, capacitors, resistors, etc., as would be apparent to a person of ordinary skill in the art.

In some implementations, the memory blocks 103 can be coupled with the row decoder/word-line driver 40 via word lines ("WLs") 333. The memory blocks 103 can be coupled with the page buffer 52 via bit lines ("BLs") 341. The row decoder/word-line driver 40 can be configured to select or unselect one of the memory blocks 103 of the memory device 25 in response to an X-path control signal provided by the control logic 70. The row decoder/word-line driver 40 can transfer voltages generated by the voltage generator 65 to one or more selected word line according to the X-path control signal. For example, during read or program operations, based on the X-path control signal, the row decoder/word-line driver 40 can transfer a read voltage $V_{read}$ or a program voltage $V_{pgm}$ to a selected word line and a pass voltage $V_{pass}$ to unselected word lines.

In some implementations, the column decoder/bit-line driver 50 can be configured to select or unselect one or more memory strings 212 in response to a Y-path control signal from the control logic 70. For example, based on the Y-path control signal, the column decoder/bit-line driver 50 can transfer an inhibit voltage $V_{inhibit}$ to an unselected bit line, and can connect a selected bit line to ground. In some implementations, in order to increase the efficiency of a write operation, the column decoder/bit-line driver 50 can transfer a bias voltage $V_{bias}$ to a selected bit line according to the Y-path control signal from the control logic 70. The page buffer 52 can be configured to read and program (write) data from and to the memory block 103 according to the Y-path control signal. In another example, the page buffer 52 can perform verify operations to ensure that the data has been properly programmed into each memory cell. In yet another example, during a read operation, the page buffer 52 can sense current flowing through the bit line 341 that reflects the logic state (i.e., data) of the memory cell coupled to the bit line, and can amplify small signals to a measurable magnification for further processing.

In some implementations, read operations and program (write) operations can be performed at the page level, and erase operations can be performed at the block level.

In some implementations, the input/output buffer 55 can transfer the I/O data from/to the page buffer 52, as well as transfer addresses (ADDR) or commands (CMD) to the control logic 70. In some implementations, the input/output buffer 55 can function as an interface between the memory device 25 and a memory controller (e.g., the memory controller 20 in FIG. 1).

The control logic 70 can control the operations of the peripheral circuit. In some implementations, the control logic 70 can control the page buffer 52 and the row decoder/word-line driver 40 in response to the commands transferred by the input/output buffer 55. For example, during a program or a read operation, the control logic 70 can control the row decoder/word-line driver 40 and the page buffer 52 to program or read data to/from a selected memory cell. The control logic can generate an X-path control signal including a row address X-ADDR and a Y-path control signal including a column address Y-ADDR. A combination of the row address X-ADDR and the column address Y-ADDR can be used to locate a selected memory cell in the memory block 103.

In some implementations, the registers 75 can be coupled to the control logic 70. The registers 75 can include status registers, command registers, feature registers, and address registers for storing status information, command operation codes (OP codes), configuration features, and command addresses.

In some implementations, the SRAM 77 can be coupled to the control logic 70. For example, the SRAM 77 can be used as a cache to store data and instructions that are frequently accessed by the control logic 70. For another example, the SRAM 77 can be used as a buffer between a memory controller (e.g., the memory controller 20 in FIG. 1) and the memory array comprising the memory blocks 103, for synchronizing data transfers.

In some implementations, the voltage generator 65 can generate voltages to be supplied to word lines and bit lines under the control of the control logic 70. The voltages generated by the voltage generator 65 can include the read voltage $V_{read}$, the program voltage $V_{pgm}$, the pass voltage $V_{pass}$, the inhibit voltage $V_{inhibit}$, the bit line bias voltage $V_{bias}$, etc.

It should be noted that the arrangement of the electronic components in the storage system 10 and the memory device 25 in FIGS. 1-4 are illustrated as non-limiting examples. In some implementations, the storage system 10 and memory device 25 can have other layouts and can include additional components. Some components (e.g., the control logic 70, the input/output buffer 55) in the memory device 25 shown in FIG. 4 can also be removed from the memory device 25, and can be provided as stand-alone electric components in the storage system 10. Some components (e.g., the control logic 70, the input-output buffer 55) in the memory device 25 shown in FIG. 4 can also be integrated with other components in the storage system 10. For example, a portion of the control logic 70 can be combined with the memory controller 20 and vice versa.

Figure 5:
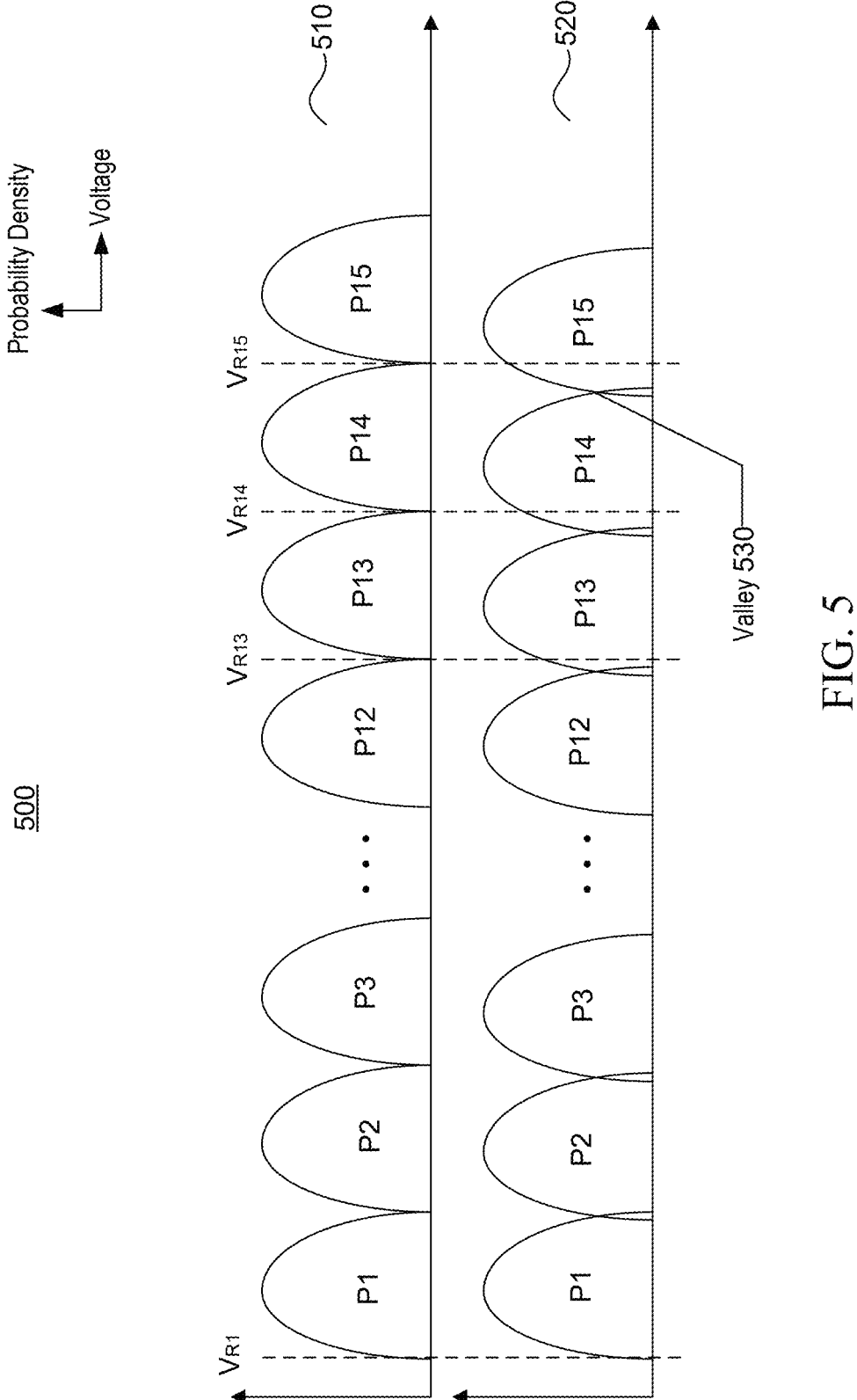
FIG. 5 illustrates a schematic diagram of an example threshold voltage distribution of a memory device, according to some aspects of the present disclosure.

FIG. 5 illustrates a schematic diagram of an example threshold voltage distribution of a memory device, according to some aspects of the present disclosure.

Referring back to FIG. 4, in some implementations, the memory block 103 can be formed based on floating gate technology. In other implementations, the memory block 103 can be formed based on charge trapping technology. A NAND flash memory based on charge trapping technology can provide high storage density and high intrinsic reliability. In the NAND flash memory, logic state (i.e., data) of the memory cell 340 in the memory block 103 can be determined by the threshold voltages $V_{th}$ of the memory cell 340, which depends on the number of charge carriers trapped in the memory film of the memory cell 340.

In some implementations, a NAND flash memory can be configured to operate in a single-level cell (SLC) mode. The memory cell 340 can be in an erased state ER or a programmed state P1. Initially, the memory cell 340 in memory block 103 can be reset to the erased state ER as logic "1", by removing the trapped charge carriers in the memory film of memory cell 340. The trapped charge carriers can be removed by implementing a negative voltage difference between the control gate of the memory cell 340 and the channel of the memory cell. In some implementations, the negative voltage difference can be implemented by setting the control gate of memory cell 340 to ground, and applying a high positive voltage (i.e., an erase voltage $V_{erase}$) to ACS 430. At the erased state ER ("state ER"), the threshold voltage $V_{th}$ of memory cell 340 can be reset to the lowest value.

The memory cell 340 can be programmed from state ER to a programmed state P1 ("state P1" or logic "0"). In some implementations, during a program operation, a positive voltage difference can be implemented between the control gate and channel of the memory cell 340. For example, a program voltage $V_{pgm}$ (e.g., a positive voltage pulse between 10 V and 20 V) can be applied on the control gate, and the corresponding bit line 341 connecting to the memory cell 340 can be connected to the ground. As a result, charge carriers can be injected into the memory film of the memory cell 340, thereby increasing the threshold voltage $V_{th}$ of the memory cell 340. Accordingly, the memory cell 340 can be programmed to State P1.

In some implementations, the state (e.g., state ER or state P1) of the memory cell 340 can be determined by performing a sensing operation to measure or sense the threshold voltage $V_{th}$ of the memory cell 340. During a sensing operation, a read reference voltage $V_R$ can be applied on the control gate of the selected memory cell, while a pass voltage $V_{pass}$ can be applied on unselected word lines to switch on unselected memory cells connected to the same bit line. The current flowing through the memory cell can be measured at the bit line 341.

In some implementations, to increase storage capacity, a NAND flash memory can also be configured to operate in a multi-level cell (MLC) mode, a triple-level cell (TLC) mode, a quad-level cell (QLC) mode, or a combination of any of these modes. In the SLC mode, a memory cell stores 1 bit of data and has two logic states, logic {1 and 0}, i.e., states ER and P1. In the MLC mode, a memory cell stores 2 bits of data, and has four logic states, logic {11, 10, 01, and 00}, i.e., states ER, P1, P2, and P3. In the TLC mode, a memory cell stores 3 bits of data, and has eight logic states, logic {111, 110, 101, 100, 011, 010, 001, 000}, i.e., states ER, and states P1-P7. In the QLC mode, a memory cell stores 4 bits of data and has 16 logic states, logic {1111, 1110, 1101, 1100, 1011, 1010, 1001, 1000, 0111, 0110, 0101, 0100, 0011, 0010, 0001, 0000}, i.e., states ER, and states P1-P15. The memory controller 20 of the storage system 10 (see FIG. 1) can convert data received from the host 15 into corresponding logic states of the memory cells in the memory devices 25, and vice versa. In some implementations, memory cells of MLCs, TLCs and QLCs can be programmed to different programmed states by using an incremental step pulse programming (ISPP) scheme. The ISPP scheme can include a plurality of program voltages Vpgm starting from a starting program voltage, with an increment of voltage $\Delta V$ to each program voltage that follows. For example, the QLC states can be programmed using the ISPP scheme from state ER with a lowest threshold voltage, to state P15 with a highest threshold voltage. In some implementations, each logic state of the memory cells can correspond to a specific range of threshold voltage Vth of the memory cells, where the threshold voltage Vth distribution of each state can be represented by a probability density.

In some implementations, after programming QLC memory cells, states P1-P15 can be verified by using one or more pre-defined read reference voltages during a verification process. By applying one or more of the pre-defined read reference voltages to the control gate of target memory cell, the range where the memory cells' threshold voltage $V_{th}$ falls in can be determined.

For example, a read reference voltage $V_{R1}$ can be used to verify if a memory cell is at state ER. Specifically, if the target memory cell is at state ER, the threshold voltage $V_{th}$ of the target memory cell should be lower than the read reference voltage $V_{R1}$, and the target memory cell should be switched on to form a conductive path in the channel. If the target memory cell is at any one of the states P1-P15, the threshold voltage $V_{th}$ of the target memory cell should be higher than the pre-defined read reference voltage $V_{R1}$, and the target memory cell should remain switched off. By measuring or sensing the current through the target memory cell at the corresponding bit line via the page buffer 52, the threshold voltage $V_{th}$ or the state of the target memory cell can be verified. For another example, as shown in diagram 510, to determine the states P1-P15 for the QLC mode, pre-defined read reference voltages $V_{R2}$, $V_{R3}$, . . . , $V_{R13}$, $V_{R14}$ and $V_{R15}$ can be used. For example, in the QLC mode, the threshold voltage $V_{th}$ of state P1 is below $V_{R2}$ (but above $V_{R1}$ used to verify State ER); $V_{th}$ of P2 is between $V_{R2}$ and $V_{R3}$; . . . ; $V_{th}$ of P13 is between $V_{R13}$ and $V_{R14}$; $V_{th}$ of P14 is between $V_{R14}$ and $V_{R15}$; and $V_{th}$ of P15 is above $V_{R15}$.

As shown in diagram 520, the threshold voltage $V_{th}$ distribution of the memory cells may shift over time. In some cases, the threshold voltage distribution of memory cells in different programmed states may shift in different ways. For example, in the case of a lower program state P1, P2 and P3, the $V_{th}$ distribution tend to shift to the slight right side, where the $V_{th}$ slightly increases. In the case of upper program states P12, P13, P14 and P15, the $V_{th}$ distribution tend to shift to the slight left side, where the $V_{th}$ slightly decreases. In some cases, after the $V_{th}$ distribution shifts, the $V_{th}$ distribution of one state may intersect with the $V_{th}$ distribution of its neighboring state. The intersection of $V_{th}$ distributions of neighboring states can form a valley. For example, as shown in diagram 520, after $V_{th}$ distribution of state P1-P15 shifts, the $V_{th}$ distribution of P15 intersects with the $V_{th}$ distribution of state P15, thereby forming valley 530.

After $V_{th}$ distribution shift, the pre-defined read levels may not be able to accurately track $V_{th}$ distribution, thereby causing read failures in the memory device. For example, as shown in diagram 520, due to $V_{th}$ distribution shift, $V_{th}$ of some memory cells in state P14 may decrease to below the predefined read reference voltage $V_{R14}$, and $V_{th}$ of some memory cells in state P15 may decrease to below the predefined read reference voltage $V_{R15}$. By applying the pre-defined read reference voltages including $V_{R1}$, $V_{R2}$, . . . , $V_{R13}$, $V_{R14}$ and $V_{R15}$ to the control gate of the target memory cell, the result that $V_{th}$ of the targe memory cells is between $V_{R14}$ and $V_{R15}$ may no longer reflect that the target memory cell is in state P14.

Figure 6A:
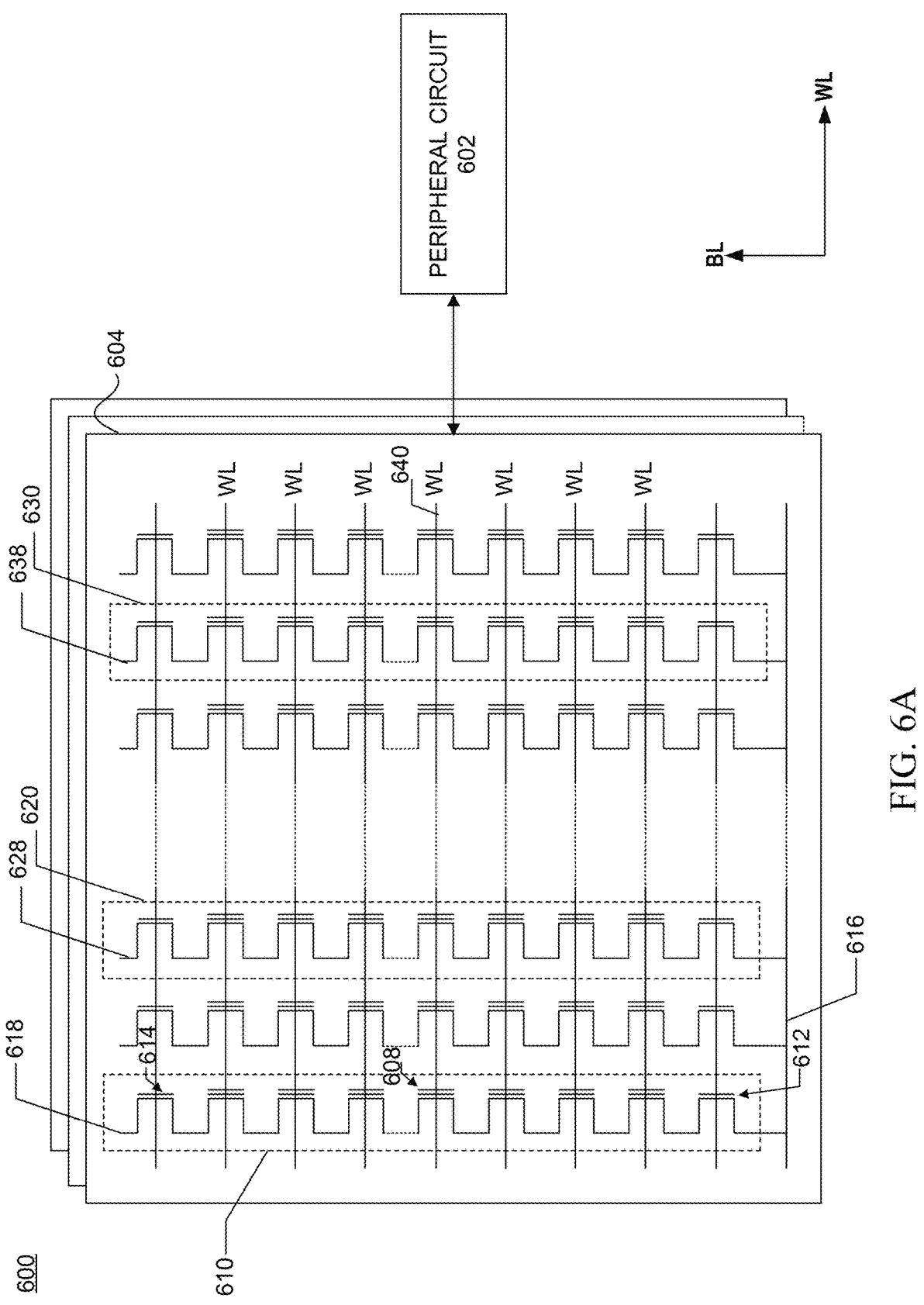
FIG. 6A illustrates an example schematic circuit diagram of a memory device, according to some aspects of the present disclosure.

FIG. 6A illustrates an example schematic circuit diagram 600 of a memory device, according to aspects of the present disclosure. The example schematic circuit diagram 600 includes a memory block 604 and a peripheral circuit 602. In some implementations, the example schematic circuit diagram 600 includes a plurality of memory strings 610, 620 and 630. Each of memory strings 610, 620 and 630 has a plurality of memory cells 608. The memory string 610 also includes at least one field effect transistor (e.g., MOSFET) at each end, which is controlled by a lower select gate (LSG) 612 and a top select gate (TSG) 614, respectively. The memory cell 608 can be controlled by a control gate, where the control gate can be connected to a word line 640 of the example schematic circuit diagram 600. The drain terminal of the TSG 614 can be connected to the bit line 618, and the source terminal of the LSG 612 can be connected to an ACS 616. The ACS 616 can be shared by the memory strings 610 in an entire memory block, and is also referred to as the common source line. In some examples, memory string 620 can be associated with bit line 628 and memory string 630 can be associated with bit line 638.

In some implementations, the memory block 604 can be a three-dimensional (3D) memory device, and the example schematic circuit diagram 600 can be a 3D memory array, where the memory cells 608 can be vertically stacked on top of each other. In some implementations, the example schematic circuit diagram 600 can be formed based on the charge trapping technology. Storage data or logic states (e.g., threshold voltage $V_{th}$ of the memory cell 608) depends on the amount of charge trapped in a storage layer of the memory cell 608. The NAND flash memory based on charge trapping can provide high storage density and high intrinsic reliability.

In a NAND memory, the memory cell 608 can be in an erase state ER or a programmed state P1. Initially, all memory cells 608 in the example schematic circuit diagram 600 can be reset to the erase state ER as logic "1" by implementing a negative voltage difference between control gates and source terminals of the memory cells (e.g., the ACS 616), so that all the trapped electronic charges in the storage layer of the memory cells 608 can be removed. For example, the negative voltage difference can be induced by setting the control gates of the memory cells 608 to ground, and applying a high positive voltage to the ACS 616. At the erase state ER ("state ER"), the threshold voltage $V_{th}$ of the memory cells 608 can be reset to the lowest value, and can be measured or sensed at the bit line 618.

During programming (i.e., writing), a programming voltage $V_{pgm}$ (e.g., a positive voltage pulse between 10 V and 20 V) can be applied on the control gate such that electronic charges (e.g., electrons) can be injected into the storage layer of the memory cell 608, and thereby increase the threshold voltage $V_{th}$ of the memory cell 608. Thus the memory cell 608 is programmed to the state P1. In some examples, memory cell 608 may be programmed to different states, such as P1-P7 in TLC mode, or P1-P15 in QLC mode.

Figure 6B:
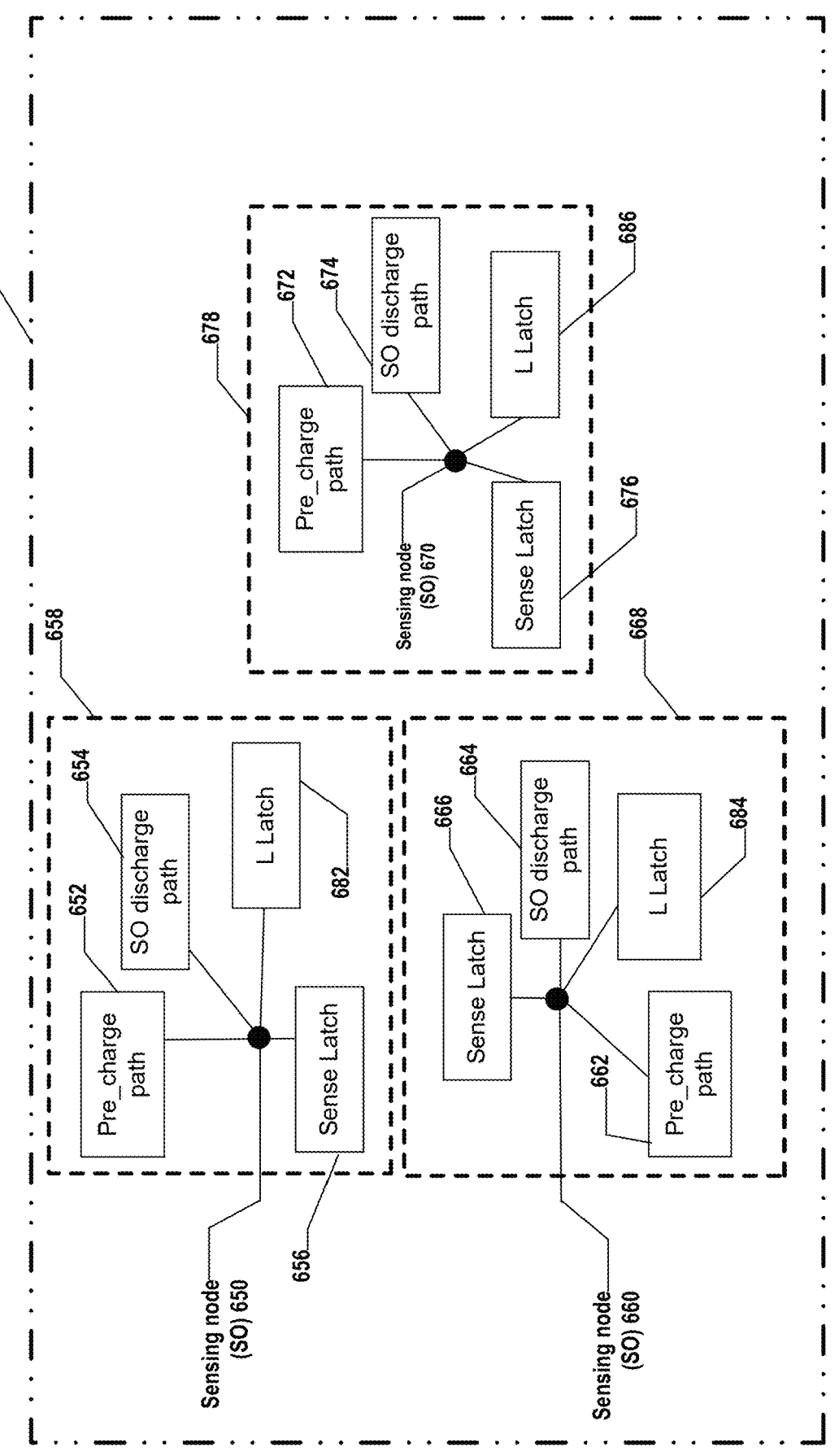
FIG. 6B illustrates an example schematic diagram of a page buffer of a memory device, according to some aspects of the present disclosure.

FIG. 6B illustrates example schematic diagram of a page buffer of a memory device, according to some aspects of the present disclosure. FIG. 6B can be described with regard to the page buffer 52 of FIG. 4 and elements of FIGS. 1-6A. Not all of the depicted components may be used, however, and one or more implementations may include additional components not shown in the figure. Variations in the arrangement and types of the components may be made without departing from the spirit or scope of the claims as set forth herein. Additionally, different or fewer components may be provided.

As illustrated in FIG. 6B, the page buffer 52 includes a first page buffer structure 658, a second page buffer structure 668, and a third page buffer structure 678. In some examples, the first page buffer structure 658 connects with the memory string 610 through the bit line 618 of FIG. 6A. In some examples, the second page buffer structure 668 connects with the memory string 620 through the bit line 628 of FIG. 6A. In some examples, the third page buffer structure 678 connects with the memory string 630 through the bit line 638 of FIG. 6A.

As shown in FIG. 6B, the first page buffer structure 658 can include a sensing node (aka. sense-out node, or SO) 650, a precharge path 652, a SO discharge path 654, an L latch 682, and a sense latch 656. The second page buffer structure 668 includes a sensing node (SO) 660, a pre-charge path 662, a SO discharge path 664, an L latch 684, and a sense latch 666. The third page buffer structure 678 includes a sensing node (SO) 670, a pre-charge path 672, a SO discharge path 674, an L latch 686, and a sense latch 676. Each of the page buffer structures 658, 668, and 678 can further include a cache latch and one or more data latches (e.g., cache latch 710 and data latches 706 and 708 of FIG. 7B).

As described with reference to FIG. 4, during a read operation, the row decoder/word-line driver 40 can transfer a read voltage $V_{read}$ to a selected word line and a pass voltage $V_{pass}$ to an unselected word line, according to the X-path control signal received from the control logic 70. The page buffer 52 can be configured to read data from and to the memory block 103 according to the Y-path control signal from the control logic 70. During the read operation, the page buffer 52 can sense current flowing through the bit line 341 that reflects the logic state (i.e., data) of the memory cell 340 and amplify small signal to a measurable magnification.

During a read operation, the first page buffer structure 658 can precharge the bit line 618 through the precharge path 652 by a control circuit (e.g., control logic 70), and can sense at the SO 650 whether a selected memory cell is turned on or off. The second page buffer structure 668 and the third page buffer structure 678 can respectively pre-charge bit lines connected thereto based on the same procedure as the precharging operation of the first page buffer structure 658.

During a read operation, the bit line 618 and the SO 650 can be precharged to a pre-determined level during a precharge period. A current can be generated (e.g., in a channel) to flow into the first page buffer structure 658 through the bit line 618. During a develop period with a develop time, when the selected memory cell is in a first state (e.g., turned on), a charge charged at the SO 650 may be discharged to the ACS 616 through the bit line 618 and the channel of a cell string through the SO discharge path 654. In this case, because the current flowing to the first page buffer structure 658 is relatively great, the speed of a voltage drop at the SO 650 may be relatively fast. On the other hand, during the develop period with the develop time, when the selected memory cell is in a second state (e.g., turned off), it may be difficult for a charge charged at the SO 650 to be discharged to the ACS 616 through the bit line 618. Accordingly, because the current flowing to the first page buffer structure 658 is relatively small, the speed of a voltage drop at the SO 650 may be relatively slow.

During a latch period, a state of the SO 650 associated with the selected memory cell may be latched to the sense latch 656 as a first state of the selected memory cell (i.e., with a logical value of 1). Alternatively, a state of the SO 650 associated with the selected memory cell may be latched to the sense latch 656 as a second state of the selected memory cell (i.e., with a logical value of 0). In some examples, a threshold voltage $V_{th}$ of the selected memory cell in the first state is larger than a read voltage $V_{read}$ in the read operation, and a threshold voltage $V_{th}$ of the selected memory cell in the second state is smaller than the read voltage $V_{read}$ in the read operation. In some examples, a memory cell can be determined to be in the first state if the memory cell is turned on when a read voltage level is applied, and a memory cell can be determined to be in the second state if the memory cell is turned off when a read voltage level is applied.

In some examples, based on the same procedure as the operations of the first page buffer structure 658 mentioned above, the second page buffer structure 668 and the third page buffer structure 678 may respectively discharge bit lines connected thereto, sense a state of the sensing node, and determine the state of the selected memory cell as a first state or a second state.

In some examples, during a read operation, a develop time during the develop period may be different for each of the first page buffer structure 658, the second page buffer structure 668 and the third page buffer structure 678. In some examples, the sensing node, precharge path, SO discharge path and sense latch associated with each of the first page buffer structure 658, the second page buffer structure 668 and the third page buffer structure 678 can be controlled separately.

Figure 7A:
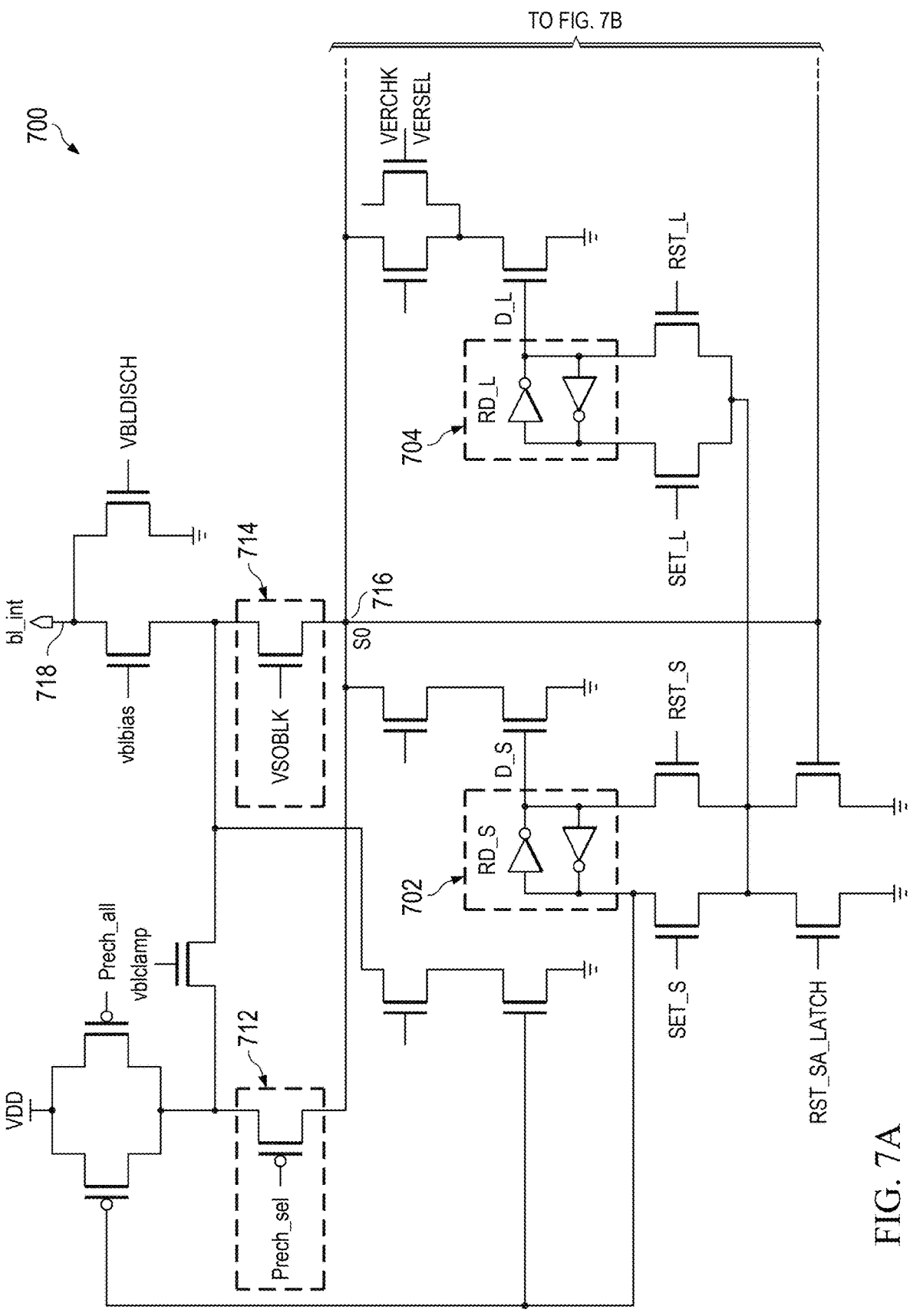
FIGS. 7A-7B illustrate an example page buffer of a memory device, according to some aspects of the present disclosure.
Figure 7B:
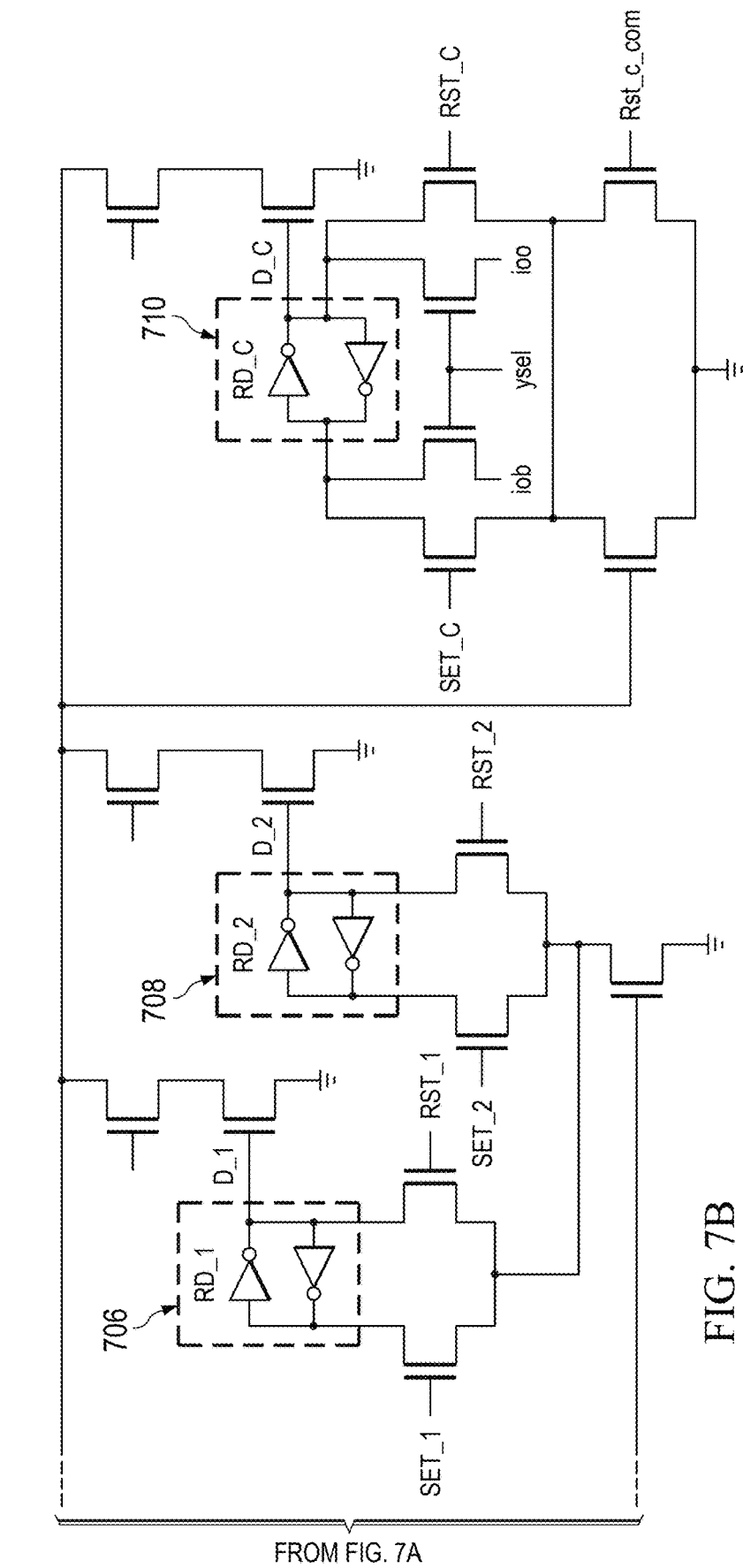

FIGS. 7A-7B illustrate an example page buffer 700 of a memory device, according to some aspects of the present disclosure. The page buffer 700 can be an example of the page buffer 52 of FIG. 4. The page buffer 700 includes a sensing latch 702, an L latch 704, data latches 706 and 708, and a cache latch 710. The sensing latch 702 can be configured to store a sensing operation result. The L latch 704 can be configured to support a fail bit count (FBC) function. In some implementations, multi-level cells (MLCs) coupled to a same word line can have multiple pages. Each page can be read using multiple read levels. The data latches 706 and 708 can be configured to store sensing operation results for each of the multiple read levels of a page of an MLC. The cache latch 710 can be configured to cache data before the data is sent out. As shown in FIGS. 7A-7B, the page buffer 700 further includes transistors 712 and 714. The transistor 712 is coupled between a pre-charging circuit and a sensing node 716. The transistor 714 is coupled between the sensing node 716 and a corresponding bit line 718. The transistors 712 and 714 can be used to determine a length of a develop time. The develop time can be a delay between a time when transistor 712 is turned off and a time when transistor 714 is turned off.

Figure 8:
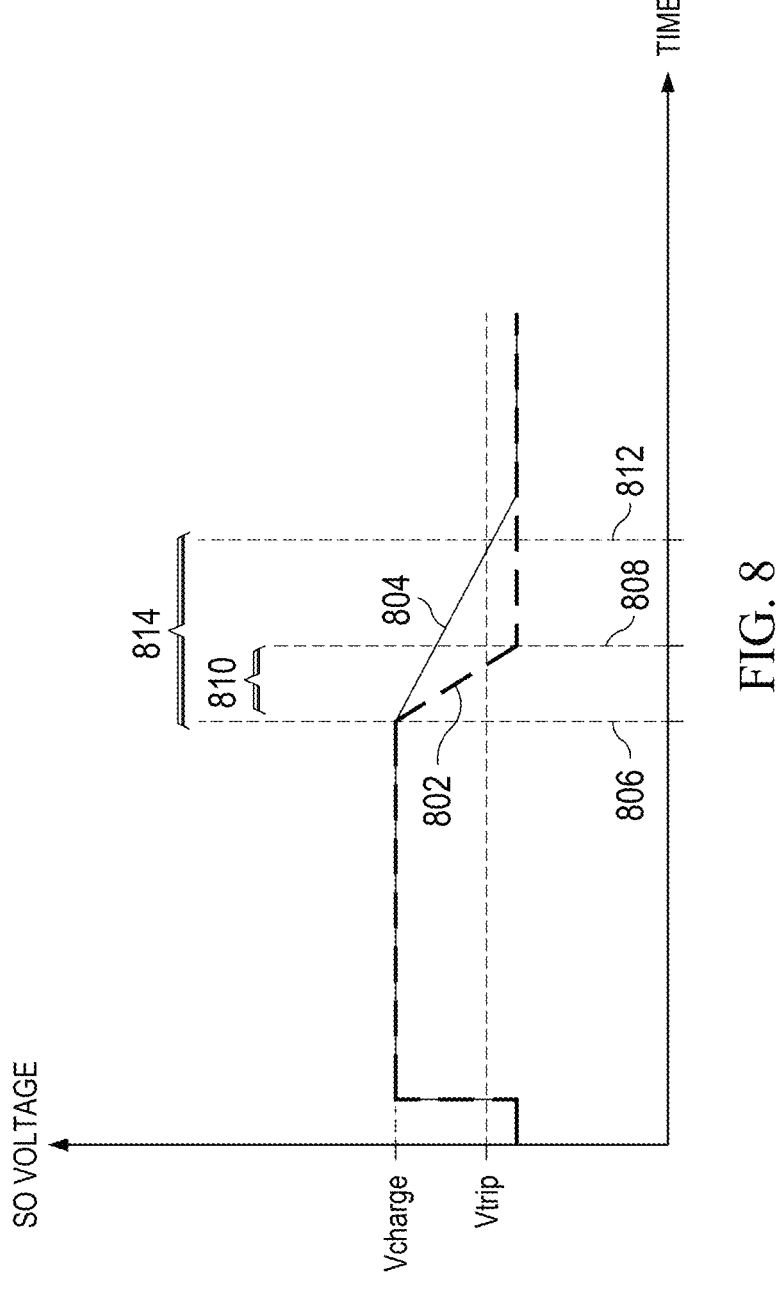
FIG. 8 illustrates example sensing node voltages of various sensing operations, according to some aspects of the present disclosure.

FIG. 8 illustrates example sensing node voltages of various sensing operations, according to some aspects of the present disclosure. A waveform 802 can be used to illustrate an example (Example 1) of a voltage level at a sensing node (SO) coupled to a memory cell with a threshold voltage $V_{th}$, when a read voltage $V_{rd1}$ ($V_{rd1} > V_{th}$) is applied to the memory cell (e.g., a gate of the memory cell or a word line coupled to the memory cell). As shown in the waveform 802, prior to time 806, the SO is precharged to a higher voltage level $V_{charge}$. The SO starts to discharge at time 806 (i.e., transistor 712 of FIG. 7A is turned off), and thus the voltage at the SO (also referred to as the SO voltage) starts to decrease. At time 808 (i.e., transistor 714 of FIG. 7A is turned off), the SO voltage can be measured and compared to a trip voltage ($V_{trip}$). A result (e.g., a logic value of 0 or 1) of this sensing operation can be stored in a sensing latch coupled to the SO. For example, if the SO voltage at time 808 is lower than $V_{trip}$, the result of this sensing operation is logic value 1. Otherwise, if the SO voltage at time 808 is higher than $V_{trip}$, the result of this sensing operation is logic value 0. The time duration (e.g., develop time 810) between a time when the discharge starts (e.g., time 806) and a time when the SO voltage is measured and compared to $V_{trip}$ (e.g., time 808) can be referred to as a develop time. In this example, when read voltage $V_{rd1}$ ($V_{rd1} > V_{th}$) and develop time $T_{d1}$ are applied, the SO voltage drops fast, because the memory cell is turned on. Thus, the result of the sensing operation in Example 1 is logic value 1.

A waveform 804 shows another example (Example 2) of the SO voltage when another read voltage $V_{rd2}$ ($V_{rd2} < V_{th}$) is applied to the memory cell. In Example 2, the memory cell is turned off under $V_{rd2}$. As a result, the SO voltage decreases slowly in waveform 804. If the same develop time 810 is applied, the result of the sensing operation in Example 2 is logic value 0, which is different from the result in Example 1.

In another example (Example 3), read voltage $V_{rd2}$ ($V_{rd2} < V_{th}$) is applied to the memory cell, but a different develop time (between time 806 and time 812, which can be referred to as develop time 814) is applied. As shown in FIG. 8, the develop time 814 is longer than the develop time 810. Thus, the SO voltage keeps dropping after time 808. When measured at time 812, the SO voltage is lower than $V_{trip}$. Accordingly, the result of the sensing operation in Example 3 is logic value 1, which is the same as the result in Example 1.

FIG. 8 illustrates that a sensing operation (e.g., Example 3) using a lower read voltage (e.g., $V_{rd2}$) and a longer develop time (e.g., develop time 814) can obtain substantially the same result as another sensing operation (e.g., Example 1) using a higher read voltage (e.g., $V_{rd1}$) and a shorter develop time (e.g., develop time 810). In other words, in sensing operations and read operations, fixing a read voltage and varying a develop time can have the same effects as varying the read voltage and fixing the develop time. Thus, in some implementations, sensing operations that use various read voltages and the same develop time can be replaced by sensing operations that use the same read voltage but various develop times.

Figure 9:
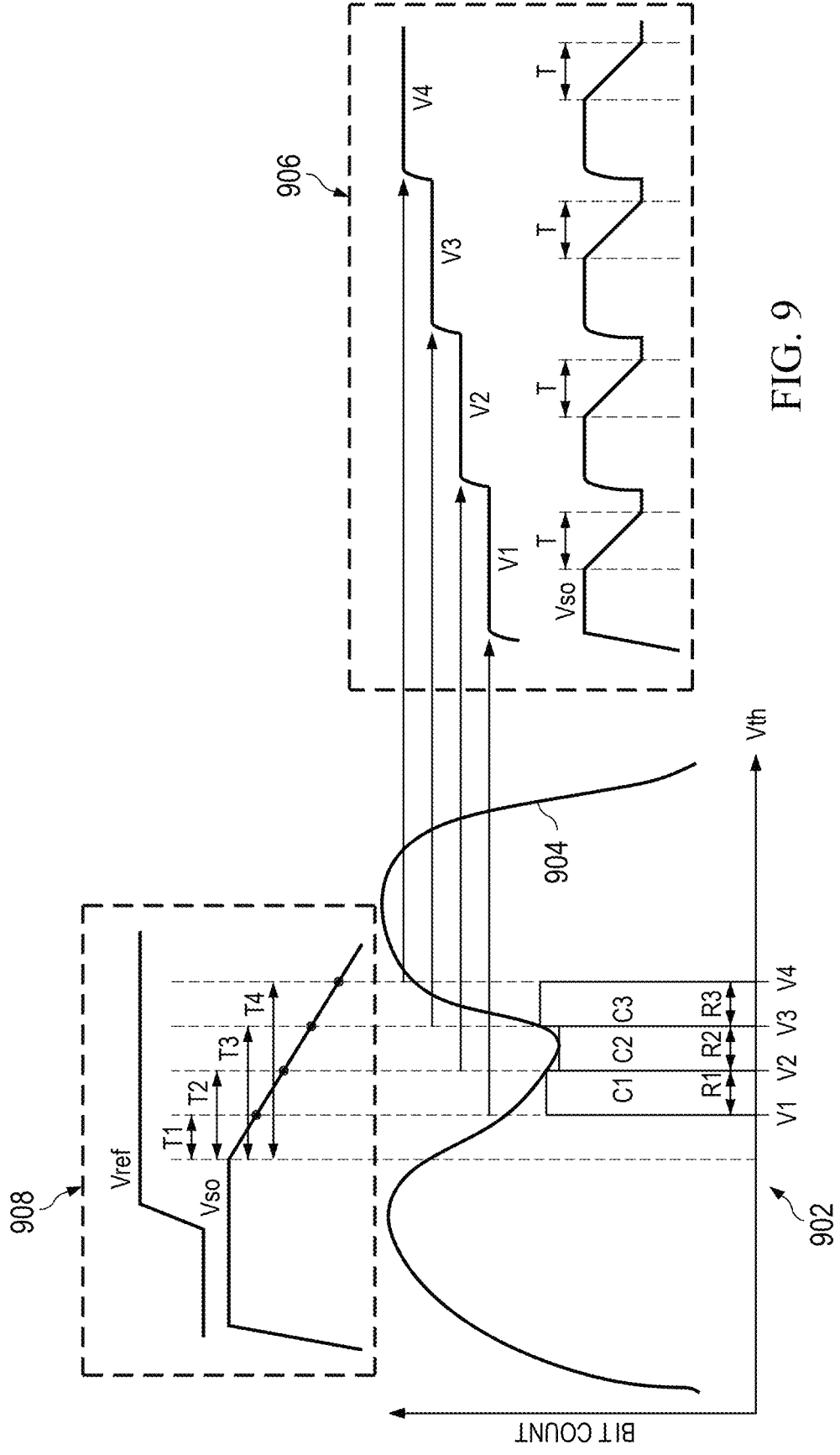
FIG. 9 illustrates example automated valley detection (AVD) methods, according to some aspects of the present disclosure.

FIG. 9 illustrates example automated valley detection (AVD) methods, according to some aspects of the present disclosure. A curve 904 in the diagram 902 includes two threshold voltage distributions for two adjacent states of memory cells in a memory device. The memory cells are coupled to the same word line. In some implementations, the memory cells can belong to one or more memory pages. An AVD method can include sensing operations to determine a valley on the curve 904 between the two threshold voltage distributions. The valley can be used as a read voltage in read operation. In some implementations, the AVD method includes determining a set of voltage ranges around the valley and determining a number for each of the set of voltage ranges. The number for each voltage range represents a quantity of memory cells whose threshold voltages fall within the voltage range. The valley is in a voltage range with the smallest number. For example, as shown in FIG. 9, four reference voltages $V_1$, $V_2$, $V_3$, and $V_4$ ($V_1 < V_2 < V_3 < V_4$) can be used to generate three voltage ranges ($R_1$, $R_2$, and $R_3$) around the valley.

In some implementations, as shown in diagram 906 of FIG. 9, the number for each voltage range can be determined by performing sensing operations based on different reference voltages and a same default develop time. For example, a quantity of the memory cells (referred to as $S_i$, $1 \le i \le 4$) whose threshold voltages are higher than the reference voltage $V_i$ can be determined by applying $V_i$ to the memory cells (e.g., the word line coupled to the memory cells) and then measuring SO voltages on sensing nodes coupled to the memory cells through respective bit lines. These sensing operations can use the same default develop time (e.g., a default develop time T as shown in FIG. 9) for different reference voltages. The number for each voltage range ($R_i$, $1 \le i \le 3$), that is, a quantity of memory cells ($C_i$, $1 \le i \le 3$) whose threshold voltages fall within each voltage range ($R_i$) can then be determined based on the quantities $N_1$, $N_2$, $N_3$, and $N_4$. For example, $C_i = S_i - S_{i+1}$ ($1 \le i \le 3$). In practical implementations, such comparisons can be performed using logical operations XOR based on results stored in the sensing latches coupled to the sensing nodes.

In the example of diagram 902, $C_2$ is the smallest number among $C_1$, $C_2$, and $C_3$. Thus, the sensing operations can determine that the valley is in voltage range $R_2$. In some implementations, the reference voltage $V_2$ (i.e., the lower limit of voltage range $R_2$) can be determined as the valley of the threshold voltage distribution curve 904. A result of the sensing operations (also referred to as a read offset) can include the reference voltage $V_2$, which can be stored in the memory device and can be used as a read voltage in subsequent read operations. In some implementations, any other suitable values determined based on voltage range $R_2$ (such as upper limit $V_3$, or an average of $V_2$ and $V_3$) can be determined as the valley of the threshold voltage distribution curve 904.

The AVD method illustrated by diagram 906 can be time consuming because determining each of the quantities $N_1$, $N_2$, $N_3$, and $N_4$ may require applying a different reference voltage to the word line coupled to the memory cells. As described with respect to FIG. 8, sensing operations that use the same reference voltage but various develop times can have similar effects as sensing operations that use various reference voltages and the same develop time. Thus, in some implementations, as shown in diagram 908, an AVD method can be performed based on sensing operations using a same reference voltage and different develop times. Sensing operations using different develop times can be performed in parallel, which can make the AVD method more efficient.

The AVD method illustrated by diagram 908 can use four develop times $T_1$, $T_2$, $T_3$, and $T_4$ ($T_1 < T_2 < T_3 < T_4$). Each develop times $T_i$ ($1 \le i \le 4$) corresponds to and can be determined based on a respective reference voltage (e.g., the reference voltage $V_i$ described with respect to diagram 906). For example, $T_1$ corresponds to $V_1$, $T_2$ corresponds to $V_2$, $T_3$ corresponds to $V_3$, and $T_4$ corresponds to $V_4$. Referring back to diagram 902, in some implementations, voltage ranges $R_1$, $R_2$, and $R_3$ can have the same size, thus any two adjacent reference voltages in the reference voltages $V_i$ ($1 \le i \le 4$) have the same voltage difference. In other words, $V_i = V_1 + (i-1) \times \Delta V$ ($1 \le i \le 4$), where $\Delta V$ is a predetermined voltage difference. In diagram 908, the following develop times can be used in a practical implementation: $T_i = T_1 + (i-1) \times \Delta T$ ($1 \le i \le 4$), where $\Delta T$ is a predetermined time difference, and $T_i$ and $\Delta T$ can be determined based on the reference voltages $V_i$. For example, sensing operations can use $T_1 = 0.5$ μs, $T_2 = 0.6$ μs, $T_3 = 0.7$ μs, and $T_4 = 0.8$ μs ($\Delta T = 0.1$ μs).

In some implementations, the same reference voltage $V_{ref}$ can be applied to the word line coupled to the memory cells. A quantity of the memory cells (referred to as $S_i$, $1 \le i \le 4$) whose threshold voltages are higher than reference voltage $V_i$ ($V_i$ corresponds to $T_i$) can be determined by applying $V_{ref}$ to the memory cells and measuring SO voltages on sensing nodes coupled to the memory cells after develop time $T_i$. The number for each voltage range ($R_i$, $1 \leq i \leq 3$), that is, a quantity of memory cells ($C_i$, $1 \leq i \leq 3$) whose threshold voltages fall within each voltage range ($R_i$) can then be determined based on the quantities $N_1$, $N_2$, $N_3$, and $N_4$. For example, $C_i = S_i - S_{i+1}$ ($1 \leq i \leq 3$). In practical implementations, such comparisons can be performed using logical operations XOR based on results stored in sensing latches coupled to the sensing nodes.

In some implementations, a develop time (e.g., $T_J$) corresponding to the reference voltage $V_J$ can represent the valley. $T_J$ can be used as the read develop time in subsequent read operations. In the example of diagram 902, $C_2$ is the smallest number among $C_1$, $C_2$, and $C_3$. Thus, the sensing operations determine that the valley is in voltage range $R_2$. In some implementations, $T_2$ corresponding to $V_2$ (i.e., lower limit of voltage range $R_2$) can represent the valley of the threshold voltage distribution curve 904. A result of the sensing operations (also referred to as a read offset) can include the develop time $T_2$, which can be stored in the memory device and can be later used as a read develop time during read operations of the memory cells. In some implementations, any other suitable develop time determined based on voltage range $R_2$ (such as $T_3$, or an average of $T_2$ and $T_3$) can be determined to represent the valley and stored as the read offset.

There are different ways to apply the develop time $T_J$ (i.e., the read offset identified by the AVD method in diagram 908) in read operations subsequent to sensing operations of the AVD method. For example, the memory device can convert the develop time $T_J$ to the corresponding reference voltage $V_J$, and a memory controller can send $V_J$ to a user (e.g., a host computer). In subsequent read operations, the user can apply $V_J$ as a read voltage and use the default develop time. Alternatively, the user can convert $V_J$ back to $T_J$, and use $T_J$ as the read develop time, while applying the pre-defined read reference voltage. For another example, the memory device can store $T_J$ in a memory (e.g., a SRAM) of the memory device. In subsequent read operations, the memory device can directly apply $T_J$ as the read develop time. Directly applying $T_J$ in read operations may avoid potential inaccuracies caused by converting between the develop time and the corresponding reference voltage.

In some implementations, the AVD method can include dividing the memory cells coupled to a word line into multiple sub-groups of equal size, and performing some of the sensing operations on selected groups of the memory cells. For example, the sensing operation to determine a quantity of memory cells (e.g., $C_i$) whose threshold voltages of the memory cells fall within a corresponding voltage range (e.g., $R_i$) is performed on a sub-group (e.g., Group i) of memory cells.

Figure 10:
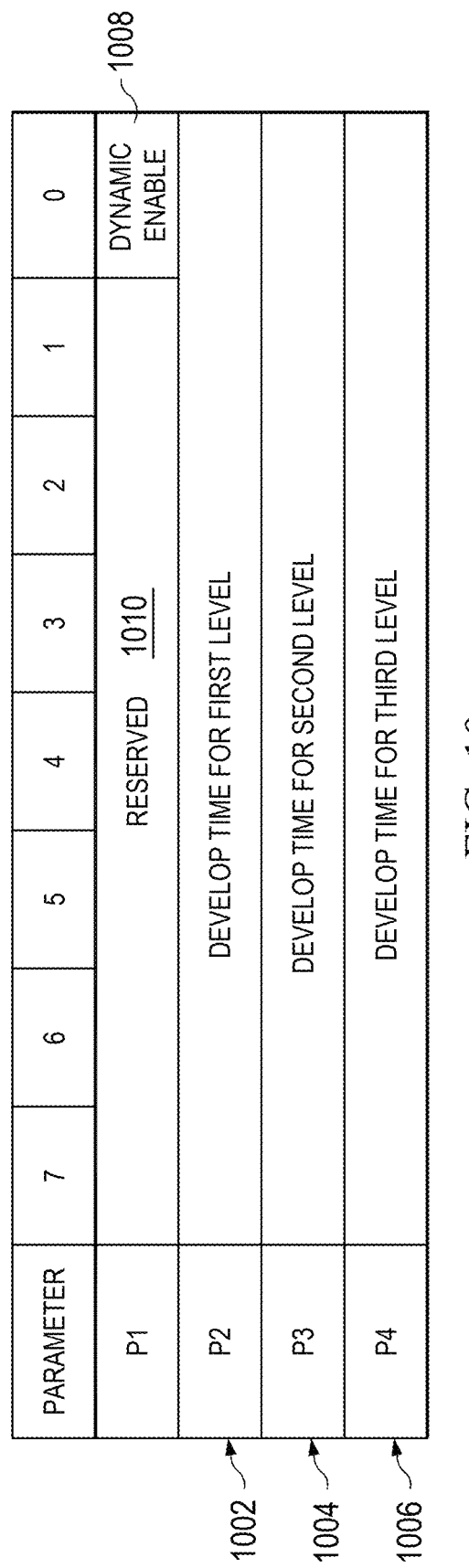
FIG. 10 illustrates an example data structure that stores a read offset, according to some aspects of the present disclosure.

FIG. 10 illustrates an example data structure 1000 comprising a read offset (i.e., a result of the sensing operations for AVD), according to some aspects of the present disclosure. In some implementations, the data structure 1000 has four bytes and includes develop times 1002, 1004, and 1006 for multiple read levels of a TLC page. For example, TLC memory cells can have three pages per word line including an upper page, a middle page, and a lower page. The develop time 1002 can be provided for level 2 (e.g., $V_{rd2}$) of the middle page. The develop time 1004 can be provided for level 4 (e.g., $V_{rd4}$) of the middle page. The develop time 1006 can be provided for level 6 (e.g., $V_{rd6}$) of the middle page. In another example, the develop time 1002 can be provided for level 3 (e.g., $V_{rd3}$) of the upper page, the develop time 1004 can be provided for level 7 (e.g., $V_{rd7}$) of the upper page, and the develop time 1006 can be empty. Develop times 1002, 1004, and 1006 each have a size of one byte.

It should be noted that the data structure 1000 as shown in FIG. 10 is for illustration only. For example, any suitable number of develop times can be stored in the data structure 1000 as a read offset. The develop times in the data structure can be identified by sensing operations using different develop times and a same reference voltage (e.g., the AVD method as shown in diagram 908 of FIG. 9). For another example, the data structure can store any suitable number of reference voltages as a read offset. The reference voltages in the data structure can be identified by a sensing operations using different reference voltages and a same develop time (e.g., the AVD method as shown in diagram 906 of FIG. 9).

In some implementations, the data structure 1000 storing the read offset may further include a dynamic enable bit 1008. Enabling the dynamic enable bit 1008 can indicate that new develop times (e.g., develop times 1002, 1004, and 1006) instead of a default develop time will be applied during a read operation. In some implementations, the data structure 1000 may further include some reserved bits 1010.

In some implementations, the data structure 1000 storing the read offset can be stored in the memory device. For example, the read offset can be stored in a SRAM (e.g., SRAM 77 in FIG. 4) of the memory device. In some implementations, data stored in the SRAM cannot be accessed by a user. To apply the read offset in a read operation, the memory device (e.g., by control logic 70 of the memory device) can access the SRAM and obtain the read offset stored therein. For another example, the read offset can be stored in a memory array (e.g., a NAND memory array) of the memory device. To apply the read offset in a read operation, the memory device (e.g., by control logic 70 of the memory device) can load the read offset from the memory array to the SRAM of the memory device.

Figure 11:
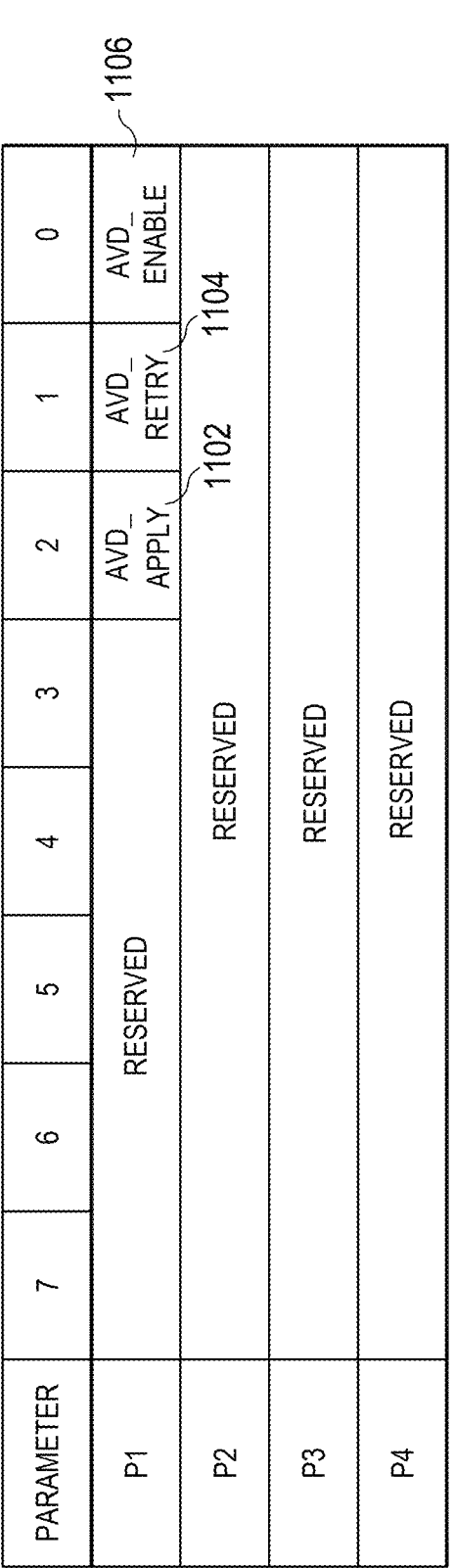
FIG. 11 illustrates an example data structure provided by a user to a memory device, according to some aspects of the present disclosure.

FIG. 11 illustrates an example data structure 1100 storing configuration data provided by a user to a memory device, according to some aspects of the present disclosure. The data structure 1100 storing configuration data can indicate to the memory device, in a read operation, whether to apply a read offset (e.g., a read voltage or a read develop time identified from previous sensing operations), or to apply a pre-defined read level (e.g., a pre-defined read reference voltage and a default develop time). In some implementations, the configuration data can be a set feature for automated valley detection (AVD) configuration and status. The data structure 1100 has four bytes, and can include a predetermined bit 1102 for AVD_APPLY, a pre-determined bit 1104 for AVD_Retry, and a pre-determined bit 1106 for AVD_EN-ABLE. For example, the pre-determined bits 1102, 1104 and 1106 can take up bits at P1[2], P1[1] and P1[0] in the data structure 1100, respectively.

In some implementations, the predetermined bit 1106 for AVD_ENABLE indicates whether to perform sensing operations to detect a valley of the threshold voltage $V_{th}$ distribution. When the bit 1106 for AVD_ENABLE is enabled (e.g., the value of the predetermined bit 1106 is 1), in response to receiving a read command from the memory controller to read data from one or more pages, the memory device can first perform sensing operations on the pages to obtain a read offset that represents a valley of the threshold voltage distribution, and store the read offset in the memory device. In some implementations, the memory device can then apply the read offset (e.g., the read offset as shown in the data structure 1000 in FIG. 10) in a read operation to read data from the page. When the predetermined bit 1106 for AVD_ENABLE is disabled (e.g., the value of predetermined bit 1106 is 0), in response to receiving a read command from the memory controller to read data from one or more pages, the memory device can perform a normal read operation on the pages, without first performing the sensing operations for AVD.

In some implementations, the predetermined bit 1104 for AVD_RETRY indicates whether to re-perform sensing operations for AVD. When the predetermined bit 1104 for AVD_RETRY is enabled (e.g., the value of predetermined bit 1104 is 1), the memory device can perform a new round of sensing operations, and store the read offset generated by the new round of sensing operations in the memory device.

In some implementations, the predetermined bit 1102 for AVD_APPLY indicates whether to apply the read offset stored in the memory device in a read operation. When the predetermined bit 1102 for AVD_APPLY is enabled (e.g., the value of predetermined bit 1102 is 1) and the predetermined bit 1106 for AVD_ENABLE is disabled, in response to receiving a read command from the memory controller to read data from one or more pages, the memory device can perform a read operation on the pages based on the read offset stored in the memory device. The read offset stored in the memory device can be generated by previous sensing operations for AVD. For example, if the read offset includes a read voltage, the memory device will perform the read operation using the read voltage as the read reference voltage $V_{read}$, and using the default develop time as the develop time $T_{develop}$. For another example, if the read offset includes a read develop time, the memory device will perform the read operation using the read develop time as $T_{develop}$, and using the pre-defined read reference voltage as $V_{read}$. When the predetermined bit 1102 for AVD_APPLY is disabled (e.g., the value of predetermined bit 1102 is 0) and the predetermined bit 1106 for AVD_ENABLE is also disabled, in response to receiving a read command from the memory controller to read data from one or more pages, the memory device can perform a normal read operation on the pages using the pre-defined read reference voltage and the default develop time.

In some implementations, when the predetermined bit 1102 for AVD_APPLY and the predetermined bit 1106 for AVD_ENABLE are both enabled, the predetermined bit 1106 for AVD_ENABLE pre-empts. That is, the memory device can first perform sensing operations for AVD to obtain a read offset, rather than first performing a read operation based on the read offset already stored in the memory device (e.g., from previous sensing operations).

In some implementations, the data structure 1100 storing the configuration data can be stored in the memory device. For example, after the memory device receives the configuration data from a user through a memory controller, the memory device can store the configuration data in a feature register (e.g., one of the registers 75 in FIG. 4) of the memory device. When the memory device receives a read command from the memory controller, the memory device can first check the configuration data in the feature register, and determine the status of the bits 1102, 1104, 1106 (e.g., value being 0 or 1). The memory device can then perform sensing operations or read operations based on the indications of the bits 1102, 1104, 1106.

It should be noted that the data structure 1100 as shown in FIG. 11 is for illustration only. Instructions to the memory device indicating to perform sensing operations or to apply the read offset in a read operation may be configured in other data forms, or may use different bits of the data structure 1100.

Figure 12:
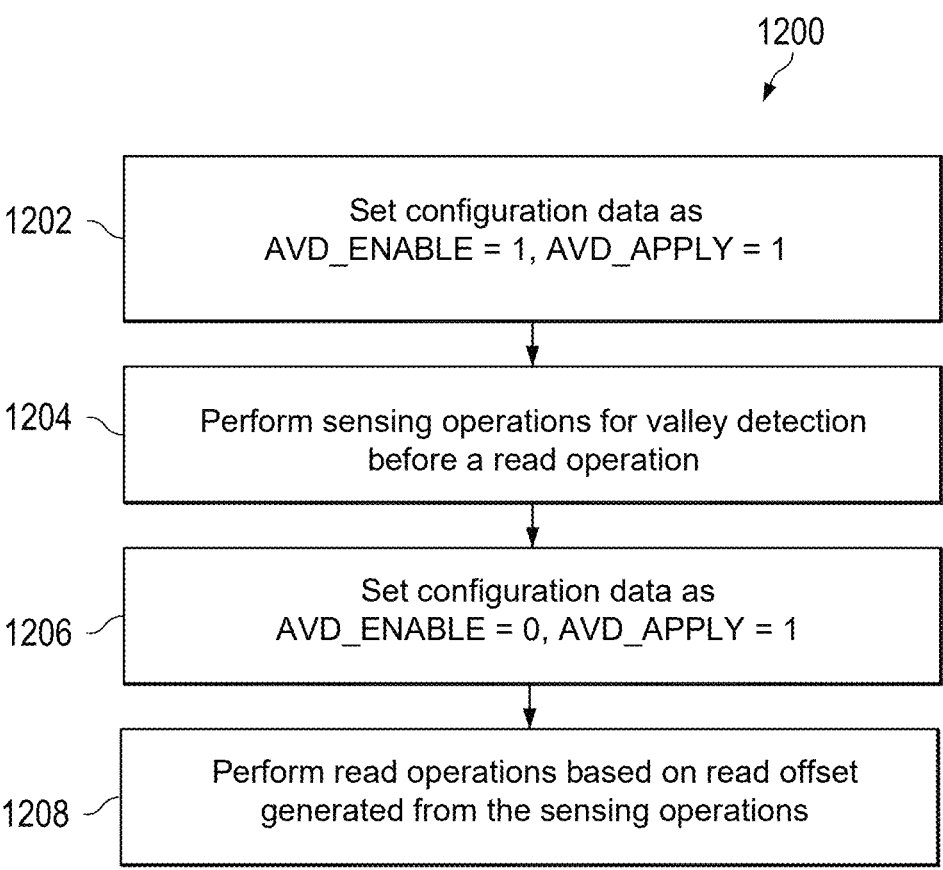
FIG. 12 illustrates an example flow chart of applying read offset in read operations, according to some aspects of the present disclosure.

FIG. 12 illustrates an example flow chart of applying a read offset in read operations, according to some aspects of the present disclosure. Method 1200 can be performed by a memory system having a memory controller (e.g., memory controller 20 in FIGS. 1-3) and one or more memory devices (e.g., memory device 25 in FIGS. 1-3) programmed appropriately in accordance with this disclosure.

At operation 1202, a user (e.g., a host computer) can set the configuration data (e.g., the data structure 1100 in FIG. 11) and send the configuration data to a memory device through a memory controller. In some implementations, the user can enable AVD_ENABLE by setting the predetermined bit 1106 as 1, and can enable AVD_APPLY by setting the predetermined bit 1102 as 1. The configuration data received by the memory device can be stored in a register (e.g., a feature register) of the memory device.

At operation 1204, in response to receiving a read command, the memory device performs sensing operations (e.g., sensing operations as shown in diagram 906 or 908) for AVD before performing a read operation. The read offset, that is, the result of the sensing operations that represents the valley of the threshold voltage distribution, can be stored in a SRAM (e.g., the SRAM 77 in FIG. 4) of the memory device. In some implementations, the memory device then performs a read operation based on the read offset identified by the sensing operations.

At operation 1206, the user can set the configuration data (e.g., data structure 1100) again to alter some of its features. For example, the user can disable AVD_ENABLE by setting the predetermined bit 1106 as 0, while keeping AVD_APPLY enabled. The memory controller can send the configuration data to the memory device. The memory device can store the configuration data in a feature register of the memory device. In some implementations, the configuration data received later overwrite the configuration data received earlier in the feature register.

At operation 1208, in response to receiving a read command, the memory device performs a read operation using the read offset stored in the SRAM. In some implementations, so long as the configuration data in the feature register remain unchanged, the memory device will perform all the subsequent read operations based on the read offset stored in the SRAM of the memory device.

Figure 13:
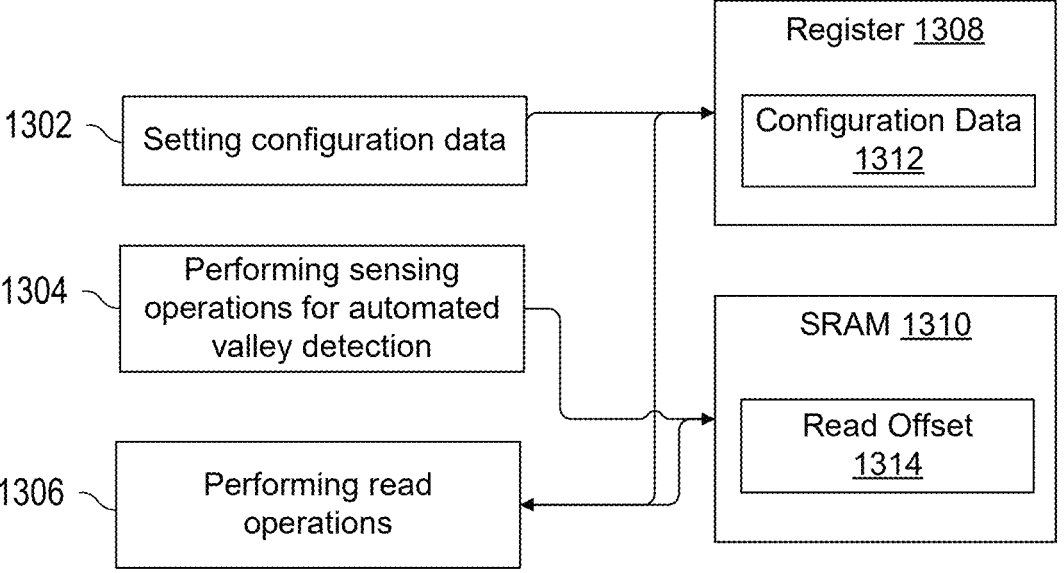
FIG. 13 illustrates an example flow chart for operating a memory device, according to some aspects of the present disclosure.

FIG. 13 illustrates an example flow chart for operating a memory device (e.g., memory device 25 of FIGS. 1-3), according to some aspects of the present disclosure.

At operation 1302, a user (e.g., host 15 in FIG. 1) sets the configuration data 1312 (e.g., data structure 1100 in FIG. 11). In some implementations, the user can set the predetermined bit 1102 for AVD_APPLY, the predetermined bit 1104 for AVD_RETRY, the predetermined bit 1106 for AVD_ENABLE according to the actual needs to operate the memory device. As an example, after detecting read failures in the memory device, the user can enable AVD_ENABLE, so that the memory device can perform sensing operations for AVD to track the shifted threshold voltage distribution, which may be the cause of the read failure. The user can send the configuration data 1312 to the memory device through a memory controller. In some implementations, the configuration data can be stored in a register 1308 (e.g., a feature register) of the memory device.

At operation 1304, the memory device can perform sensing operations for AVD to obtain a read offset 1314 (e.g., data structure 1000 in FIG. 10). For example, the read offset

1314 that includes a read voltage can be identified by performing sensing operations based on different reference voltages and a same develop time, as shown in diagram 906 in FIG. 9. For another example, the read offset that includes a read develop time can be identified by performing sensing operations using the same reference voltage and different develop times, as shown in diagram 908 in FIG. 9. In some implementations, the read offset 1314 can be stored in a SRAM 1310 of the memory device. In other implementations, the read offset 1314 can be stored in a memory array of the memory device, and can be loaded to the SRAM 1310 when needed.

At operation 1306, when the memory device receives a read command from the memory controller, the memory device can first check the configuration data 1312 stored in the register 1308. For example, if the configuration data 1312 indicates to apply the read offset (e.g., the predetermined bit 1102 for AVD_APPLY is 1, and the predetermined bit 1106 for AVD_ENABLE is 0), the memory device will perform a read operation based on the read offset 1314 in the SRAM 1310. For another example, if the configuration data 1312 indicates to conduct automated valley detection (e.g., the predetermined bit 1102 for AVD_APPLY is 1, and predetermined bit 1106 for AVD_ENABLE is 1), the memory device will perform sensing operations to obtain a read offset, which can be stored in SRAM 1310. In some implementations, the read offset identified by new sensing operations can overwrite the read offset from previous sensing operations in the SRAM 1310.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

According to one aspect of the present disclosure, a method for operating a memory device is provided. The method includes performing sensing operations on memory cells of the memory device. The memory cells are coupled to a word line. The method further includes identifying, based on results of the sensing operations, a read offset including at least one of a read voltage or a read develop time. The read voltage is selected from at least one voltage, and the read develop time is selected from at least one develop time. The method further includes storing the read offset in the memory device.

In some implementations, the read offset is stored in a SRAM of the memory device.

In some implementations, the method further includes receiving configuration data from a memory controller. The method further includes, in response to receiving a read command from the memory controller, determining that the configuration data indicate to apply the read offset, and performing a read operation on the memory cells based on the read offset stored in the memory device.

In some implementations, the configuration data have four bytes. The four bytes include a predetermined bit, and the predetermined bit indicates to apply the read offset when a value of the predetermined bit is 1.

In some implementations, the configuration data are stored in a register of the memory device.

In some implementations, the sensing operations are based on a fixed develop time and the at least one voltage comprising N voltages represented by $V_1$, $V_2$, . . . , $V_N$ ($V_1 < V_2 < . . . < V_N$). The sensing operations include, for each voltage $V_i$ ($1 \leq i \leq N$), applying $V_i$ to the word line, and upon discharging sensing nodes coupled to the memory cells for the fixed develop time, determining a size $S_i$ of a subset of memory cells from the memory cells. Voltages at sensing nodes coupled to the subset of memory cells are higher than a predetermined threshold. Identifying the read offset includes selecting, based on $C_i$ ($1 \leq i \leq N-1$), a voltage $V_J$ from the N voltages as the read voltage, where $C_i = S_i - S_{i+1}$ ($1 \leq i \leq N-1$), and $C_J$ is the smallest number among $C_i$.

In some implementations, the sensing operations are based on a fixed voltage and the at least one develop time comprising N develop times represented by $T_1$, $T_2$, . . . , $T_N$ ($T_1 < T_2 < . . . < T_N$). The sensing operations include applying the fixed voltage to the word line, and for each develop times $T_i$ ($1 \leq i \leq N$), upon discharging sensing nodes coupled to the memory cells for $T_i$, determining a size $S_i$ of a subset of memory cells from the memory cells. Voltages at sensing nodes coupled to the subset of memory cells are higher than a predetermined threshold. Identifying the read offset includes selecting, based on $C_i$ ($1 \leq i \leq N-1$), a develop time $T_J$ from the N develop times as the read develop time, where $C_i = S_i - S_{i+1}$ ($1 \leq i \leq N-1$), and $C_J$ is the smallest number among $C_i$.

In some implementations, the method further includes performing a read operation on the memory cells based on the read offset. The read operations includes applying the fixed voltage to the word line, and upon discharging sensing nodes coupled to the memory cells for the read develop time $T_J$, sensing data from the sensing nodes.

According to another aspect of the present disclosure, a method for operating a memory system is disclosed. The method includes sending, from the memory controller to the memory device, configuration data that indicate whether to apply a read offset. The read offset is stored in the memory device and includes at least one of a read voltage or a read develop time. The method further includes, in response to receiving a read command from the memory controller by the memory device, determining by the memory device that the configuration data indicate to apply the read offset, and performing by the memory device a read operation based on the read offset.

In some implementations, the read offset is stored in a SRAM of the memory device.

In some implementations, the method further includes storing the configuration data in a register of the memory device.

In some implementations, the configuration data have four bytes. The four bytes include a first predetermined bit, which indicates to apply the read offset when a value of the first predetermined bit is 1.

In some implementations, the four bytes further include a second predetermined bit. The second predetermined bit indicates to perform sensing operations when a value of the second predetermined bit is 1, and the read offset is generated from the sensing operations.

In some implementations, the method further includes, in response to determining that the value of the second predetermined bit is 1, performing sensing operations by the memory device to obtain the read offset. The method further includes, after performing the sensing operations, setting, by the memory controller, the value of the second predetermined bit to 0.

In some implementations, the sensing operations are based on a fixed develop time and the at least one voltage comprising N voltages represented by $V_1$, $V_2$, . . . , $V_N$ ($V_1 < V_2 < . . . < V_N$). The sensing operations include, for each voltage $V_i$ ($1 \leq i \leq N$), applying $V_i$ to the word line, and upon discharging sensing nodes coupled to the memory cells for the fixed develop time, determining a size $S_i$ of a subset of memory cells from the memory cells. Voltages at sensing nodes coupled to the subset of memory cells are higher than a predetermined threshold. A voltage $V_j$ is selected, based on $C_i$ ($1 \leq i \leq N-1$), from the N voltages as the read voltage, where $C_i = S_i - S_{i+1}$ ($1 \leq i \leq N-1$), and $C_j$ is the smallest number among $C_i$.

In some implementations, the sensing operations are based on a fixed voltage and the at least one develop time comprising N develop times represented by $T_1$, $T_2$, . . . , $T_N$ ($T_1 < T_2 < . . . < T_N$). The sensing operations include applying the fixed voltage to the word line, and for each develop times $T_i$ ($1 \leq i \leq N$), upon discharging sensing nodes coupled to the memory cells for $T_i$, determining a size $S_i$ of a subset of memory cells from the memory cells. Voltages at sensing nodes coupled to the subset of memory cells are higher than a predetermined threshold. A develop time Tris selected, based on $C_i$ ($1 \leq i \leq N-1$), from the N develop times as the read develop time, where $C_i = S_i - S_{i+1}$ ($1 \leq i \leq N-1$) and $C_j$ is the smallest number among $C_i$.

In some implementations, the read operation includes applying the fixed voltage to the word line, and upon discharging sensing nodes coupled to the memory cells for the read develop time, sensing data from the sensing nodes.

According to another aspect of the present disclosure, a memory system is provided. The memory system includes a memory controller configured to send configuration data that indicate whether to apply a read offset, wherein the read offset comprises at least one of a read voltage or a read develop time. The memory system further includes a memory device coupled to the memory controller. The memory device is configured to store the configuration data received from the memory controller, determine that the configuration data indicates to apply the read offset, and perform a read operation based on the read offset.

In some implementations, the memory device is further configured to perform the read operation in response to a read command received from the memory controller.

In some implementations, the configuration data have four bytes comprising a predetermined bit, wherein the predetermined bit indicates to apply the read offset when a value of the predetermined bit is 1.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one implementation," "an implementation," "an example implementation," "some implementation," etc., indicate that the implementation described can include a particular feature, structure, or characteristic, but every implementation may not necessarily include the particular feature, structure, or characteristic. Moreover, such phrases do not necessarily refer to the same implementation. Further, when a particular feature, structure or characteristic is described in connection with an implementation, it would be within the knowledge of a person skilled in the pertinent art to affect such feature, structure, or characteristic in connection with other implementations whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

As used herein, the term "substrate" refers to a material onto which subsequent material layers are added. The substrate includes a "top" surface and a "bottom" surface. The top surface of the substrate is typically where a semiconductor device is formed, and therefore the semiconductor device is formed at a top side of the substrate unless stated otherwise. The bottom surface is opposite to the top surface and therefore a bottom side of the substrate is opposite to the top side of the substrate. The substrate itself can be patterned. Materials added on top of the substrate can be patterned or can remain unpatterned. Furthermore, the substrate can include a wide array of semiconductor materials, such as silicon, germanium, gallium arsenide, indium phosphide, etc. Alternatively, the substrate can be made from an electrically non-conductive material, such as a glass, a plastic, or a sapphire wafer.

As used herein, the term "layer" refers to a material portion including a region with a thickness. A layer has a top side and a bottom side where the bottom side of the layer is relatively close to the substrate and the top side is relatively away from the substrate. A layer can extend over the entirety of an underlying or overlying structure, or can have an extent less than the extent of an underlying or overlying structure. Further, a layer can be a region of a homogeneous or inhomogeneous continuous structure that has a thickness less than the thickness of the continuous structure. For example, a layer can be located between any set of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, there above, and/or there below. A layer can include multiple layers. For example, an interconnect layer can include one or more conductive and contact layers (in which contacts, interconnect lines, and/or vertical interconnect accesses (VIAs) are formed) and one or more dielectric layers.

As used herein, the terms "about" or "approximately" indicate the value of a given quantity that can vary based on a particular technology node associated with the subject semiconductor device. Based on the particular technology node, the terms "about" or "approximately" can indicate a value of a given quantity that varies within, for example, 10-30% of the value (e.g., ±10%, ±20%, or ±30% of the value).

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

What is claimed is:

1. A method for operating a memory device, comprising:
receiving configuration data, wherein the configuration data comprises a first predetermined bit indicating whether to apply a read offset and a second predetermined bit indicating whether to perform sensing operations to obtain the read offset;
in response to determining that the second predetermined bit indicates to perform sensing operations, performing sensing operations on memory cells of the memory device, wherein the memory cells are coupled to a word line, wherein the sensing operations are based on:
N voltages and a fixed develop time; or
a fixed voltage and N develop times;
identifying, based on results of the sensing operations, the read offset comprising at least one of a read voltage or a read develop time, wherein the read voltage is selected from the N voltages, and wherein the read develop time is selected from the N develop times; and
storing the read offset in the memory device;
receiving a read command; and
in response to determining that the first predetermined bit indicates to apply the read offset, performing a read operation on the memory cells based on the read offset stored in the memory device.

2. The method of claim 1, wherein the read offset is stored in a SRAM of the memory device.

3. The method of claim 1, further comprising:
receiving configuration data from a memory controller; and
in response to receiving a read command from the memory controller:
determining that the configuration data indicate to apply the read offset; and
performing a read operation on the memory cells based on the read offset stored in the memory device.

4. The method of claim 3, wherein the configuration data have four bytes comprising the first predetermined bit and the second predetermined bit, and wherein the first predetermined bit indicates to apply the read offset when a value of the first predetermined bit is 1.

5. The method of claim 4, wherein the configuration data are stored in a register of the memory device.

6. The method of claim 1, wherein the sensing operations are based on a fixed develop time and the N voltages represented by $V_1, V_2, \ldots, V_N$ ($V_1 < V_2 < \ldots < V_N$), wherein the sensing operations comprise:

22 for each voltage $V_i$ ($1 \le i \le N$):
applying $V_i$ to the word line; and
upon discharging sensing nodes coupled to the memory cells for the fixed develop time, determining a size Si of a subset of memory cells from the memory cells, wherein voltages at sensing nodes coupled to the subset of memory cells are higher than a predetermined threshold, and wherein identifying the read offset comprises:
selecting, based on $C_i$ ($1 \le i \le N-1$), a voltage $V_J$ from the N voltages as the read voltage, wherein $C_i = S_i - S_{i+1}$ ($1 \le i \le N-1$), and wherein $C_J$ is the smallest number among $C_i$.

7. The method of claim 1, wherein the sensing operations are based on a fixed voltage and the N develop times represented by $T_1, T_2, \ldots, T_N$ ($T_1 < T_2 < \ldots < T_N$), wherein the sensing operations comprise:
applying the fixed voltage to the word line; and
for each develop times $T_i$ ($1 \le i \le N$), upon discharging sensing nodes coupled to the memory cells for $T_i$, determining a size $S_i$ of a subset of memory cells from the memory cells, wherein voltages at sensing nodes coupled to the subset of memory cells are higher than a predetermined threshold, and wherein identifying the read offset comprises:
selecting, based on $C_i$ ($1 \le i \le N-1$), a develop time $T_J$ from the N develop times as the read develop time, wherein $C_i = S_i - S_{i+1}$ ($1 \le i \le N-1$), and wherein $C_J$ is the smallest number among $C_i$.

8. The method of claim 7, further comprising:
performing a read operation on the memory cells based on the read offset, wherein the read operation comprises:
applying the fixed voltage to the word line; and
upon discharging sensing nodes coupled to the memory cells for the read develop time $T_J$, sensing data from the sensing nodes.

9. A method for operating a memory system comprising a memory device and a memory controller, the method comprising:
sending, from the memory controller to the memory device, configuration data comprising a first predetermined bit and a second predetermined bit, wherein the first predetermined bit indicates whether to apply a read offset, and the second predetermined bit indicates whether to perform sensing operations, wherein the read offset is generated from the sensing operations and stored in the memory device and comprises at least one of a read voltage or a read develop time; and
in response to receiving a read command from the memory controller by the memory device:
determining, by the memory device, that the first predetermined bit indicates to apply the read offset; and
performing, by the memory device, a read operation based on the read offset.

10. The method of claim 9, wherein the read offset is stored in a SRAM of the memory device.

11. The method of claim 9, further comprising:
storing the configuration data in a register of the memory device.

12. The method of claim 9, wherein the configuration data have four bytes, wherein the first predetermined bit indicates to apply the read offset when a value of the first predetermined bit is 1.

13. The method of claim 12, wherein the second predetermined bit indicates to perform sensing operations when a value of the second predetermined bit is 1.

14. The method of claim 13, further comprising:

in response to determining that the value of the second predetermined bit is 1, performing, by the memory device, sensing operations to obtain the read offset; and after performing the sensing operations, setting, by the memory controller, the value of the second predetermined bit to 0.

15. The method of claim 13, wherein the sensing operations are performed based on a fixed develop time and N voltages represented by $V_1, V_2, \ldots, V_N$ ($V_1 < V_2 < \ldots < V_N$), wherein the sensing operations comprise:

for each voltage $V_i$ ($1 \leqslant i \leqslant N$):

applying $V_i$ to a word line, wherein the word line is coupled to memory cells of the memory device; and upon discharging sensing nodes coupled to the memory cells for the fixed develop time, determining a size $S_i$ of a subset of memory cells from the memory cells, wherein voltages at sensing nodes coupled to the subset of memory cells are higher than a predetermined threshold, wherein a voltage $V_J$ is selected, based on $C_i$ ($1 \leqslant i \leqslant N-1$), from the N voltages as the read voltage, wherein $C_i = S_i - S_{i+1}$ ($1 \leqslant i \leqslant N-1$), and wherein $C_J$ is the smallest number among $C_i$.

16. The method of claim 13, wherein the sensing operations are performed based on a fixed voltage and N develop times represented by $T_1, T_2, \ldots, T_N$ ($T_1 < T_2 < \ldots < T_N$), wherein the sensing operations comprise:

applying the fixed voltage to a word line, wherein the word line is coupled to memory cells of the memory device; and for each develop time $T_i$ ($1 \leqslant i \leqslant N$), upon discharging sensing nodes coupled to the memory cells for $T_i$, determining a size $S_i$ of a subset of memory cells from the memory cells, wherein voltages at sensing nodes coupled to the subset of memory cells are higher than a predetermined threshold, wherein a develop time $T_J$ is selected, based on $C_i$ ($1 \leqslant i \leqslant N-1$), from the N develop times as the read develop time, wherein $C_i = Si - S_{i+1}$ ($1 \leqslant i \leqslant N-1$), and wherein $C_J$ is the smallest number among $C_i$.

17. The method of claim 16, wherein the read operation comprises:

applying the fixed voltage to the word line; and upon discharging sensing nodes coupled to the memory cells for the read develop time, sensing data from the sensing nodes.

18. A memory system comprising:

a memory controller, configured to send configuration data comprising a first predetermined bit and a second predetermined bit, wherein the first predetermined bit indicates whether to apply a read offset, and the second predetermined bit indicates whether to perform sensing operations, wherein the read offset is generated from the sensing operations and comprises at least one of a read voltage or a read develop time; and a memory device coupled with the memory controller and configured to:

store the configuration data received from the memory controller;

determine that the first predetermined bit indicates to apply the read offset; and perform a read operation based on the read offset.

19. The memory system of claim 18, wherein the memory device is further configured to perform the read operation in response to a read command received from the memory controller.

20. The memory system of claim 18, wherein the configuration data have four bytes, wherein the first predetermined bit indicates to apply the read offset when a value of the predetermined bit is 1.

* * * * *